US012587363B2

(12) United States Patent
Bercovitz et al.

(10) Patent No.:  US 12,587,363 B2
(45) Date of Patent:  Mar. 24, 2026

(54) METHOD AND APPARATUS FOR IMPROVED VIDEO INFORMATION SECURITY AGAINST UNAUTHORIZED ACCESS

(71) Applicant: Verkada Inc., San Mateo, CA (US)

(72) Inventors: Benjamin J. Bercovitz, San Mateo, CA (US); Mason R. Swofford, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/182,100

(22) Filed: Mar. 10, 2023

(65) Prior Publication Data

US 2024/0305448 A1      Sep. 12, 2024

(51) Int. Cl.
| | |
|---|---|
| *H04L 9/08* | (2006.01) |
| *G06F 21/62* | (2013.01) |
| *H04L 9/32* | (2006.01) |

(52) U.S. Cl.
CPC ........ *H04L 9/0825* (2013.01); *G06F 21/6209* (2013.01); *H04L 9/3226* (2013.01); *H04L 9/3236* (2013.01); *G06F 2221/2141* (2013.01)

(58) Field of Classification Search
None
See application file for complete search history.

(56) References Cited

U.S. PATENT DOCUMENTS

| | | | | | |
|---|---|---|---|---|---|
| 6,789,195 | B1 * | 9/2004 | Prihoda | ..................... | H04L 9/32 |
| | | | | | 713/168 |
| 10,691,837 | B1 * | 6/2020 | Martel | .................. | H04L 9/0863 |

| | | | | | |
|---|---|---|---|---|---|
| 10,819,507 | B2 | 10/2020 | Dewan | | |
| 11,526,281 | B1 | 12/2022 | Valkaitis | | |
| 2001/0019613 | A1 * | 9/2001 | Dillon | .................... | H04H 60/15 |
| | | | | | 380/240 |
| 2007/0186110 | A1 * | 8/2007 | Takashima | ......... | H04N 21/4325 |
| | | | | | 375/E7.009 |

(Continued)

FOREIGN PATENT DOCUMENTS

| | | | |
|---|---|---|---|
| WO | WO-2001052473 | A1 * | 4/2000 |

OTHER PUBLICATIONS

Skiff: Usable, Privacy-first Collaboration, Mar. 2021, 6 pages.

(Continued)

*Primary Examiner* — Taghi T Arani
*Assistant Examiner* — Joshua Raymond White
(74) *Attorney, Agent, or Firm* — COOLEY LLP

(57) ABSTRACT

In an embodiment, a method includes receiving, from a compute device associated with (1) an organization and (2) a user account that is associated with the organization, a request for sensor data captured by a sensor. The method further includes sending, to the compute device, an encrypted private key generated by encrypting a private key associated with the organization using an identifier key, to cause the compute device to decrypt the encrypted private key using the identifier key to obtain the private key after receiving the encrypted private key. The method further includes sending, to the compute device, an encrypted media key generated by encrypting a media key using a public key associated with the organization, to cause the compute device to decrypt the encrypted media key using the private key to obtain the media key after receiving the encrypted media key.

20 Claims, 14 Drawing Sheets

(56) References Cited

U.S. PATENT DOCUMENTS

| | | | |
|---|---|---|---|
| 2010/0095118 A1* | 4/2010 | Meka | G06F 21/6227 |
| | | | 713/168 |
| 2014/0115327 A1* | 4/2014 | Gorbach | H04L 9/0825 |
| | | | 713/165 |
| 2018/0331824 A1 | 11/2018 | Racz et al. | |
| 2020/0413107 A1* | 12/2020 | Allen | H04L 65/80 |
| 2022/0374546 A1* | 11/2022 | Wang | G06Q 30/08 |
| 2023/0401292 A1* | 12/2023 | Angel | H04L 63/0428 |

OTHER PUBLICATIONS

Tresorit, "Tresorit Encryption Whitepaper," Aug. 1, 2022, 17 pages.
International Search Report and Written Opinion for PCT Application No. PCT/US2024/019164 dated Jun. 6, 2024, 11 pages.

* cited by examiner

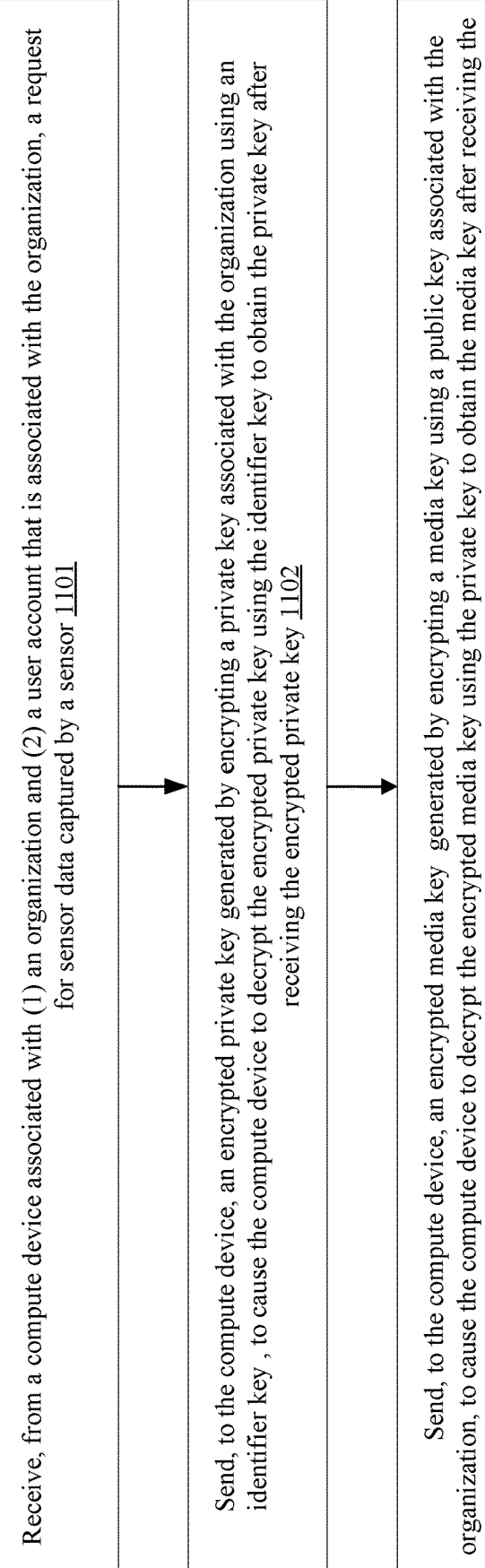

1100

Receive, from a compute device associated with (1) an organization and (2) a user account that is associated with the organization, a request for sensor data captured by a sensor 1101

Send, to the compute device, an encrypted private key generated by encrypting a private key associated with the organization using an identifier key , to cause the compute device to decrypt the encrypted private key using the identifier key to obtain the private key after receiving the encrypted private key 1102

Send, to the compute device, an encrypted media key  generated by encrypting a media key using a public key associated with the organization, to cause the compute device to decrypt the encrypted media key using the private key to obtain the media key after receiving the encrypted media key 1103

Cause the compute device to receive encrypted sensor data generated by encrypting the sensor data using the media key, to cause the compute device to, in response to receiving the encrypted sensor data, (1) decrypt the encrypted sensor data using the media key to obtain the sensor data and (2) output a representation of the sensor data 1104

FIG. 11

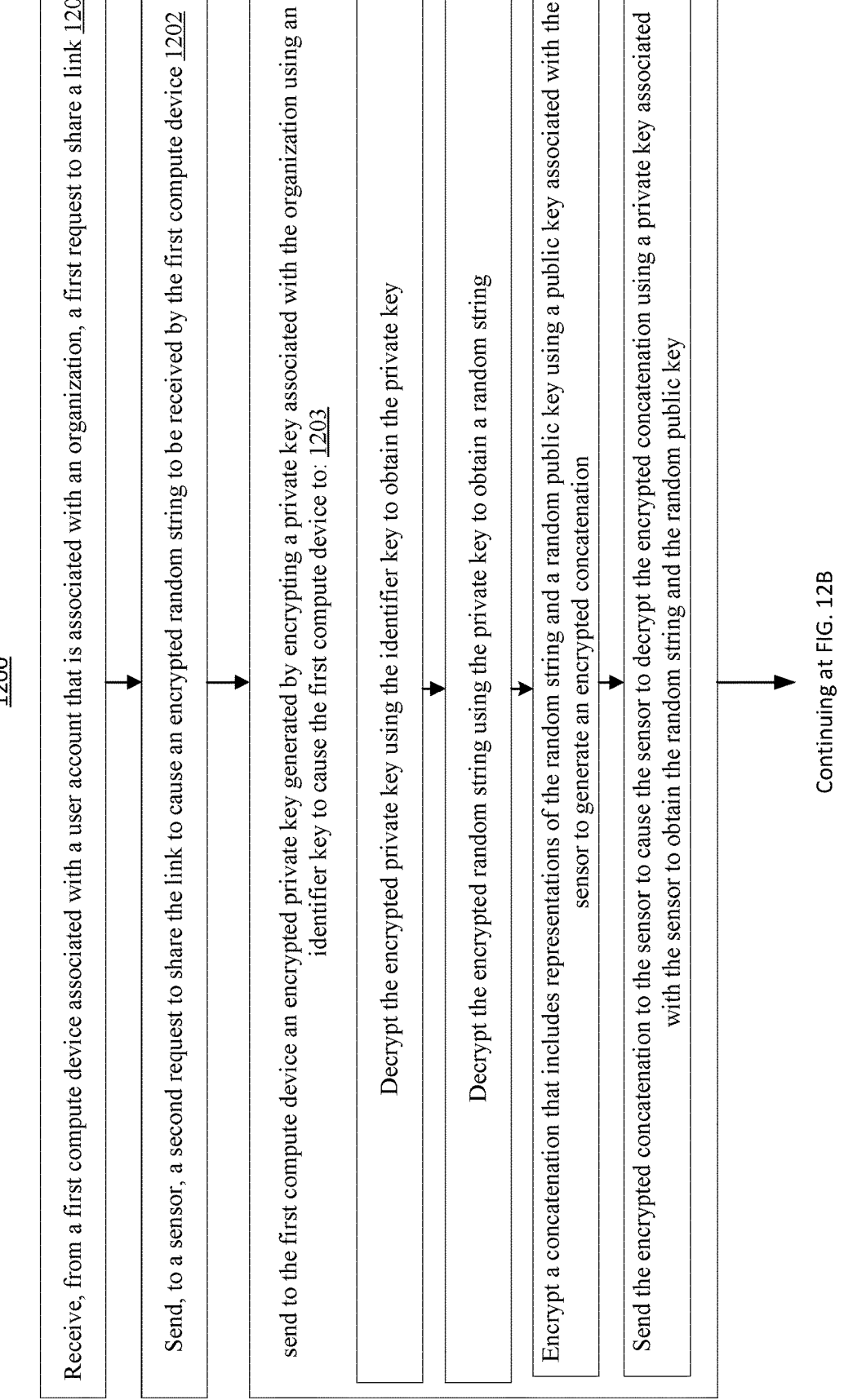

1200

Receive, from a first compute device associated with a user account that is associated with an organization, a first request to share a link 1201

Send, to a sensor, a second request to share the link to cause an encrypted random string to be received by the first compute device 1202 send to the first compute device an encrypted private key generated by encrypting a private key associated with the organization using an identifier key to cause the first compute device to: 1203

Decrypt the encrypted private key using the identifier key to obtain the private key Decrypt the encrypted random string using the private key to obtain a random string Encrypt a concatenation that includes representations of the random string and a random public key using a public key associated with the sensor to generate an encrypted concatenation Send the encrypted concatenation to the sensor to cause the sensor to decrypt the encrypted concatenation using a private key associated with the sensor and the random public key Continuing at FIG. 12B

FIG. 12A

Continuing from FIG. 12A

Send to a second compute device an encrypted media key that was generated by encrypting a media key using the random public key after the random public key was received from the sensor, to cause the second compute device to: 1204

Receive from the first compute device the link generated by the first compute device and including a representation of a random private key Receive encrypted sensor data generated by encrypting sensor data captured by the sensor using the media key Decrypt the encrypted media key using the random private key to obtain the media key Decrypt the encrypted sensor data using the media key to obtain the sensor data

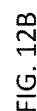

FIG. 12B

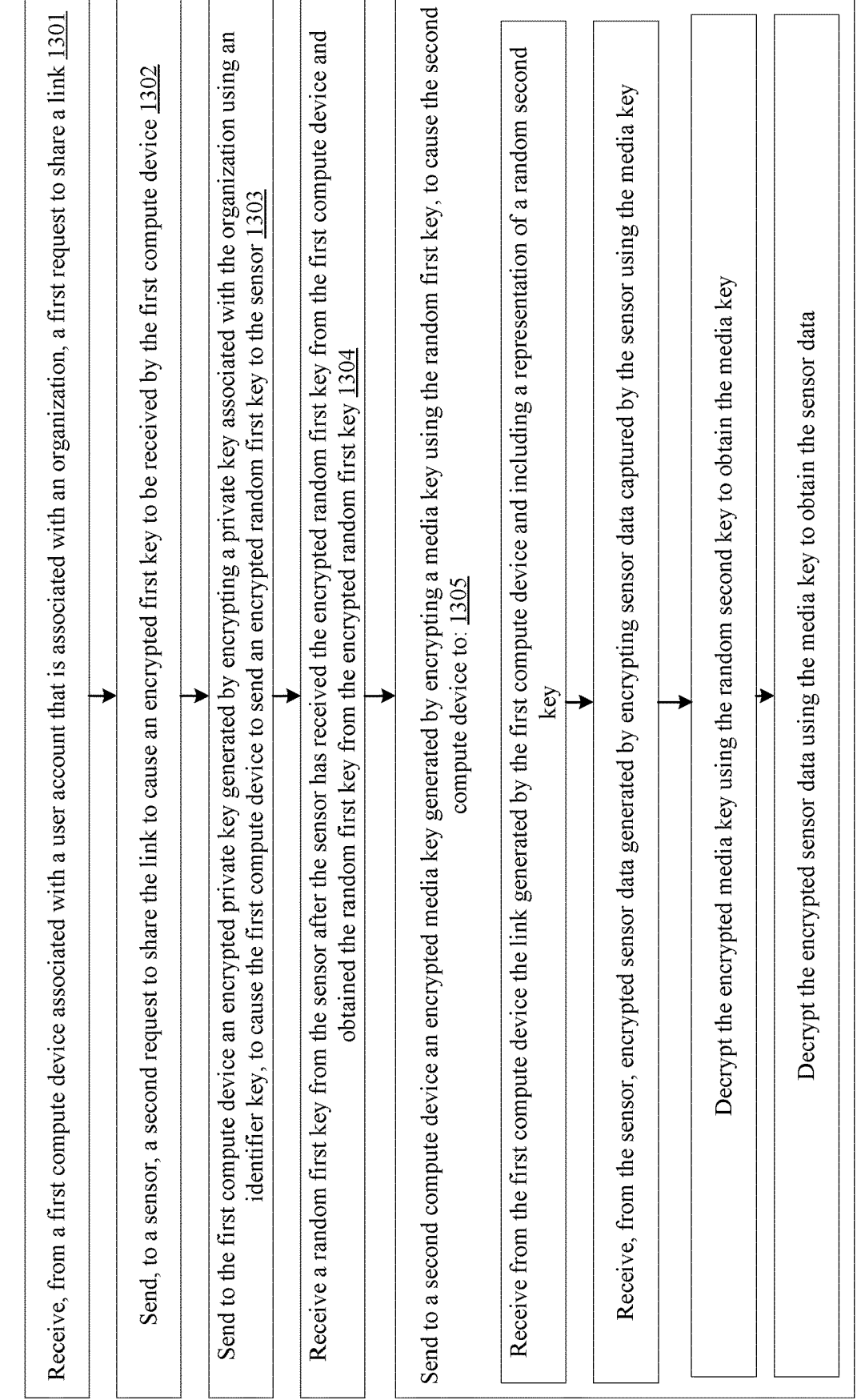

1300

Receive, from a first compute device associated with a user account that is associated with an organization, a first request to share a link 1301

Send, to a sensor, a second request to share the link to cause an encrypted first key to be received by the first compute device 1302

Send to the first compute device an encrypted private key generated by encrypting a private key associated with the organization using an identifier key, to cause the first compute device to send an encrypted random first key to the sensor 1303

Receive a random first key from the sensor after the sensor has received the encrypted random first key from the first compute device and obtained the random first key from the encrypted random first key 1304

Send to a second compute device an encrypted media key generated by encrypting a media key using the random first key, to cause the second compute device to: 1305

Receive from the first compute device the link generated by the first compute device and including a representation of a random second key Receive, from the sensor, encrypted sensor data generated by encrypting sensor data captured by the sensor using the media key Decrypt the encrypted media key using the random second key to obtain the media key Decrypt the encrypted sensor data using the media key to obtain the sensor data

FIG. 13

METHOD AND APPARATUS FOR IMPROVED VIDEO INFORMATION SECURITY AGAINST UNAUTHORIZED ACCESS

FIELD

One or more embodiments are related to a method and apparatus for improved video information security against unauthorized access.

BACKGROUND

A user may desire to view video captured by a sensor. In some instances, another party/compute device acts as a liaison, collecting and/or providing sensor data for the user to view (e.g., via an application, via a website, etc.). The sensor and/or liaison, however, may have access to the sensor data, which can be undesirable in at least some instances.

SUMMARY

In an embodiment, a method includes receiving, via a processor and from a compute device associated with (1) an organization and (2) a user account that is associated with the organization, a request for sensor data captured by a sensor. The method further includes sending, via the processor and to the compute device, an encrypted private key generated by encrypting a private key associated with the organization using an identifier key, to cause the compute device to decrypt the encrypted private key using the identifier key to obtain the private key after receiving the encrypted private key. The method further includes sending, via the processor and to the compute device, an encrypted media key generated by encrypting a media key using a public key associated with the organization, to cause the compute device to decrypt the encrypted media key using the private key to obtain the media key after receiving the encrypted media key. The method further includes causing, via the processor, the compute device to receive encrypted sensor data generated by encrypting the sensor data using the media key, to cause the compute device to, in response to receiving the encrypted sensor data, (1) decrypt the encrypted sensor data using the media key to obtain the sensor data and (2) output a representation of the sensor data.

In an embodiment, an apparatus comprises a memory and a processor operatively coupled to the memory. The processor is configured to receive, from a first compute device associated with a user account that is associated with an organization, a first request to share a link. The processor is further configured to send, to a sensor, a second request to share the link to cause an encrypted random string to be received by the first compute device. The processor is further configured to send to the first compute device an encrypted private key generated by encrypting a private key associated with the organization using an identifier key to cause the first compute device to: decrypt the encrypted private key using the identifier key to obtain the private key, decrypt the encrypted random string using the private key to obtain a random string, encrypt a concatenation that includes representations of the random string and a random public key using a public key associated with the sensor to generate an encrypted concatenation, and send the encrypted concatenation to the sensor to cause the sensor to decrypt the encrypted concatenation using a private key associated with the sensor to obtain the random string and the random public key. The processor is further configured to send to a second compute device an encrypted media key that was generated by encrypting a media key using the random public key after the random public key was received from the sensor, to cause the second compute device to: receive from the first compute device the link generated by the first compute device and including a representation of a random private key, receive encrypted sensor data generated by encrypting sensor data captured by the sensor using the media key, decrypt the encrypted media key using the random private key to obtain the media key, and decrypt the encrypted sensor data using the media key to obtain the sensor data.

In an embodiment, a non-transitory processor-readable medium stores code representing instructions to be executed by one or more processors. The instructions comprise code to cause the one or more processors to receive, from a first compute device associated with a user account that is associated with an organization, a first request to share a link. The instructions further comprise code to cause the one or more processors send, to a sensor, a second request to share the link to cause an encrypted first key to be received by the first compute device. The instructions further comprise code to cause the one or more processors send to the first compute device an encrypted private key generated by encrypting a private key associated with the organization using an identifier key, to cause the first compute device to send an encrypted random first key to the sensor.

The instructions further comprise code to cause the one or more processors receive a random first key from the sensor after the sensor has received the encrypted random first key from the first compute device and obtained the random first key from the encrypted random first key. The instructions further comprise code to cause the one or more processors send to a second compute device an encrypted media key generated by encrypting a media key using the random first key, to cause the second compute device to: receive from the first compute device the link generated by the first compute device and including a representation of a random second key; receive, from the sensor, encrypted sensor data generated by encrypting sensor data captured by the sensor using the media key; decrypt the encrypted media key using the random second key to obtain the media key; and decrypt the encrypted sensor data using the media key to obtain the sensor data.

BRIEF DESCRIPTION OF THE DRAWINGS

FIG. 11 shows a flowchart of a method for accessing sensor data, according to an embodiment.

FIGS. 12A-12B show a flowchart of a method for sharing a link to access sensor data, according to an embodiment.

FIG. 13 show a flowchart of a method for sharing a link to access sensor data, according to an embodiment.

DETAILED DESCRIPTION

A user may desire to access sensor data captured by a sensor. To do so, the user may login a user account at, for example, a website or application. One or more embodiments herein are related to allow the user to access the sensor data, while preventing the sensor and/or other compute devices (e.g., hosting the website or application) from accessing the sensor data.

Some implementations enable encrypted sensor (e.g., video) playback with a central party's authorization without enabling the central party to decrypt the playback. In some implementations, a compute device associated with (e.g., owned by, accessible by, etc.) the central party coordinates the process of distributing encrypted keys to various devices (e.g., sensor, user compute device, etc.) and performs authorization checks to ensure proper distribution. The compute device associated with the central party also gates the flow of encrypted bytes (e.g., either directly between a sensor and user compute device, or through the central party compute device) using authorization checks and instructions to the sensor. In some instances, an organization-wide shared private key (e.g., data ownership private key) only known to a decryption unit (e.g., in RAM, secure element coprocessor, public key cryptography standards (pkcs) smart card, and/or the like) of each of the organization's client computers (or other playback interfaces such as tablet, phone, smart tv) can be used to perform one or more techniques discussed herein.

Figure 1:
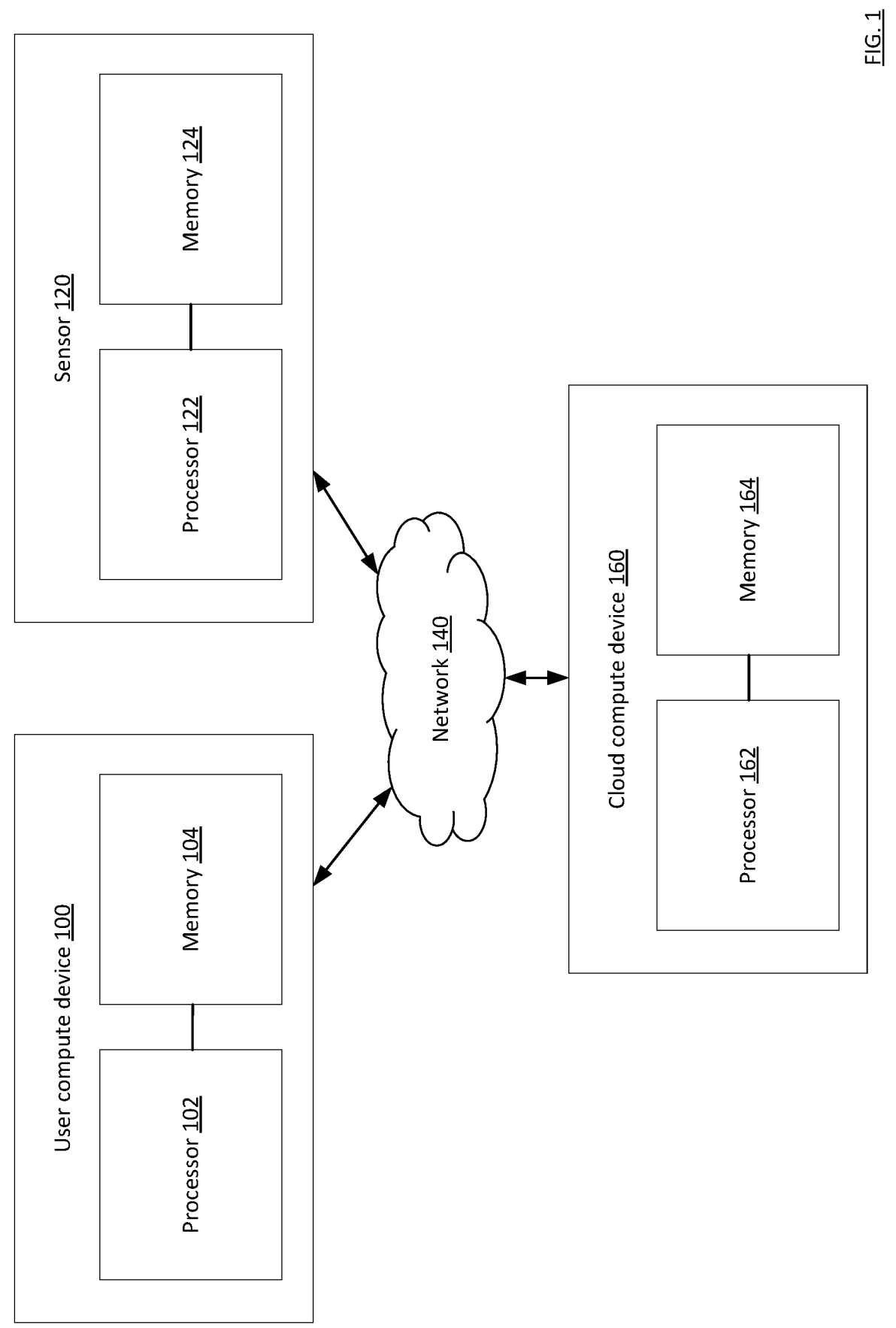
FIG. 1 shows a block diagram of a system that can securely exchange information such that only a user compute device can view an otherwise encrypted set of sensor data, according to an embodiment.

FIG. 1 shows a block diagram of a system that can securely exchange information such that only a user compute device can view an otherwise encrypted set of sensor data, according to an embodiment. More specifically, FIG. 1 shows a user compute device 100, sensor 120, and cloud compute device 160, each operatively coupled to one another via a network 140.

The network 140 can be any suitable communications network for transferring data, operating over public and/or private networks. For example, the network 140 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the network 140 can be a wireless network such as, for example, a Wi-Fi or wireless local area network ("WLAN"), a wireless wide area network ("WWAN"), and/or a cellular network. In other instances, the network 140 can be a wired network such as, for example, an Ethernet network, a digital subscription line ("DSL") network, a broadband network, and/or a fiber-optic network. In some instances, the network 140 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 140 can be encrypted or unencrypted. In some instances, the network 140 can include multiple networks or subnetworks operatively coupled to one another by, for example, network bridges, routers, switches, gateways and/or the like.

The user compute device 100 can be associated with (e.g., owned by, operated by, accessible by, etc.) a user. The user compute device 100 can be, for example, a desktop, laptop, server, tablet, mobile compute device, smart watch, internet-of-things device, and/or the like. The user compute device 100 can include a processor 102 operatively coupled to a memory 104 (e.g., via a system bus).

The sensor 120 can be any type of sensor that collects sensor data, such as a camera, temperature sensor, pressure sensor, biometric sensor, and/or the like. In some instances, the sensor 120 includes a processor 122 operatively coupled to a memory 124 (via a system bus).

The cloud compute device 160 can be remote from user compute device 100 and/or sensor 120. The cloud compute device 160 can include cloud infrastructure to operate as a cloud. The cloud compute device 160 can, for example, provide on-demand availability of one or more (e.g., multiple) computer system resources without direct active management by a user. The cloud compute device 160 can include a processor 162 operatively coupled to a memory 164 (e.g., via a system bus). The cloud compute device 160 may be used to manage users and/or user accounts for one or more organizations as they attempt to access sensor data. In some instances, the cloud compute device 160 and sensor 120 (but not necessarily user compute device 100) are associated with (e.g., owned by, operated by, used by, etc.) the same organization. An organization can be made up on any set of users (e.g., one user, two users, hundreds of users, thousands of users, etc.).

For example, the organization can be a company, and the set of users can be employees of the company. As another example, the organization can be a family, and the set of users can be the family members. As another example, the organization can be a single person (e.g., a student, a security guard, an engineer, etc.), and the set of users can be that single person. In some implementations, the organization is associated with (e.g., owns, uses, can have access to, etc.) one or more sensors (e.g., sensor 120) that collect sensor data, and the set of users are users that have access to the sensor data and/or can have access to the sensor data (e.g., after completing a verification process).

The processors 102, 122, 162 can be, for example, a hardware-based integrated circuit (IC) or any other suitable processing device configured to run and/or execute a set of instructions or code. For example, the processors 102, 122, 162 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102, 122, 162 can be configured to run any of the methods and/or portions of methods discussed herein.

The memories 104, 124, 164 can be, for example, a random-access memory (RAM), a memory buffer, a hard drive, a read-only memory (ROM), an erasable programmable read-only memory (EPROM), and/or the like. The memories 104, 124, 164 can be configured to store any data used by the processors 102, 122, 162 (respectively) to perform the techniques (methods, processes, etc.) discussed herein. In some instances, the memories 104, 124, 164 can store, for example, one or more software programs and/or code that can include instructions to cause the processors 102, 122, 162 (respectively) to perform one or more processes, functions, and/or the like. In some implementations, the memories 104, 124, 164 can include extendible storage units that can be added and used incrementally. In some implementations, the memories 104, 124, 164 can be a portable memory (for example, a flash drive, a portable hard disk, and/or the like) that can be operatively coupled to the processors 102, 122, 162. In some instances, the memories 104, 124, 164 can be remotely operatively coupled with a compute device (not shown in FIG. 1).

In some instances, data, software, firmware, and/or the like associated with the processors 102, 122, and/or 162 can be encrypted (e.g., using an organization private key) to prevent someone with unauthorized physical access to processors 102, 122, and/or 162. In some instances, the data stored memories 104, 124, and/or 164 can be encrypted (e.g., using an organization private key) to prevent someone with unauthorized physical access to memories 104, 124, and/or 164.

In some instances, a user of user compute device 100 may wish to receive a representation of sensor data collected by sensor 120. The user may desire, however, to keep the sensor data kept private (e.g., from sensor 120, from cloud compute device 160, etc.). Therefore, some implementations are related to the user compute device 100 being able to display/output/obtain sensor data collected by sensor 120 while preventing sensor 120 and/or cloud compute device 160 from having access to the sensor data.

FIGS. 2-8 shows block diagrams of various data/information that can be exchanged between various devices to allow a user compute device (e.g., user compute device 100) to have access to a video without allowing other compute devices to have unencrypted access to the video.

In some instances, the user compute device is subject to authorization restrictions by a cloud compute device (e.g., cloud compute device 160) even though the cloud compute device does not itself have unencrypted access to the video.

Figure 2:
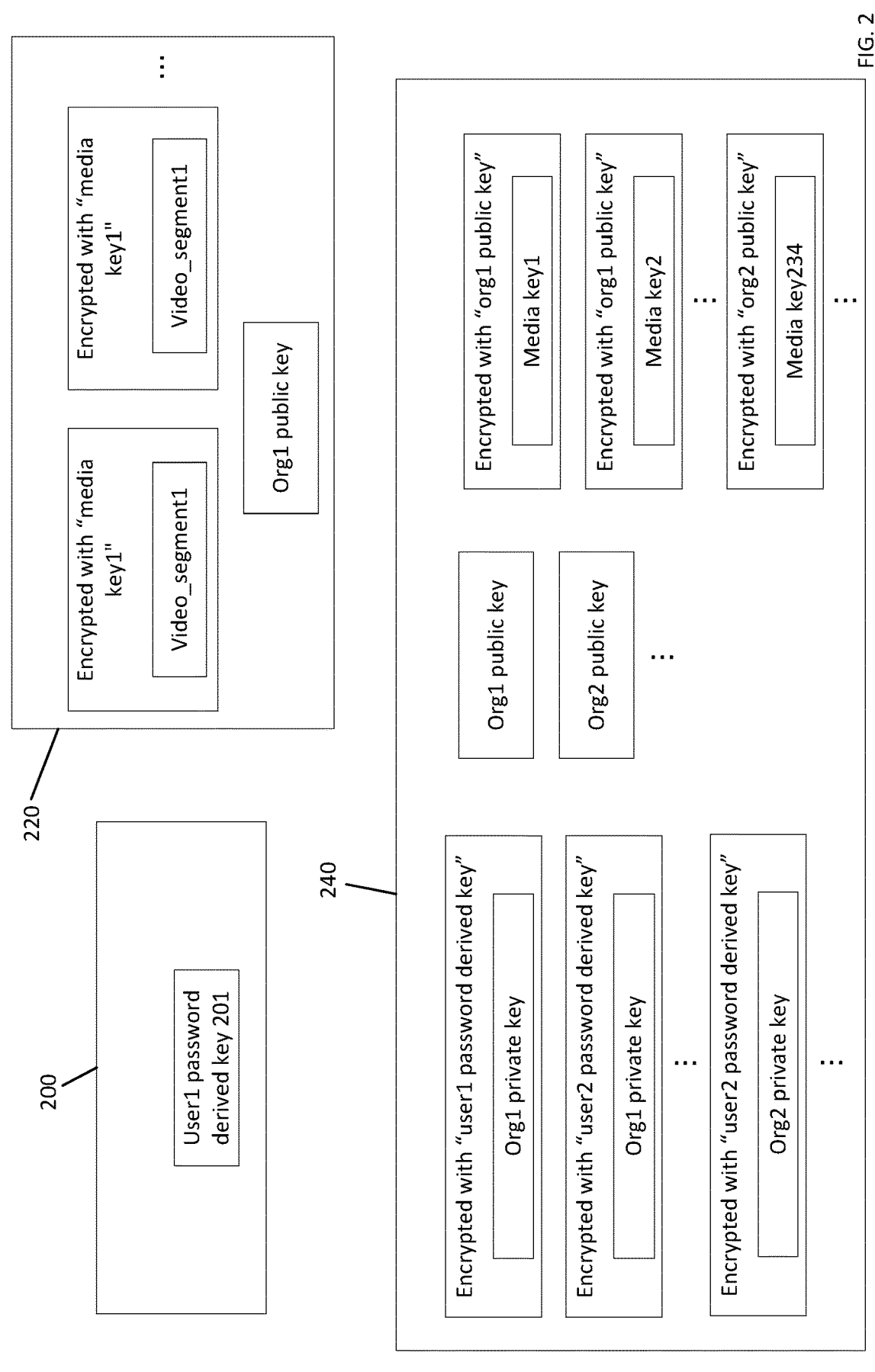
FIG. 2 shows a block diagram of a system that includes a user compute device, camera, and cloud compute device, according to an embodiment.

FIG. 2 shows a block diagram of a system that includes a user compute device 200 (e.g., user compute device 100), camera 220 (e.g., sensor 120), and cloud compute device 240 (e.g., cloud compute device 160), each operatively coupled to one another (e.g., via network 140). In some instances, the cloud compute device 240 can be associated with a plurality of organizations.

One or more users from each organization may desire to access (e.g., view, download, open, etc.) sensor data collected by a sensor (e.g., camera 220 and/or a sensor not shown in FIG. 2). In some implementations, the sensor is a camera. The camera can collect images and/or video. In some implementations, the images and/or video captured by the camera can only be accessed by one user at a given moment (and not other users). In some implementations, the images and/or video captured by the camera can be accessed by multiple different users at once. The images and/or video captured by the camera (accessible by the single user and/or multiple different users) can be viewed in real time (e.g., livestream) and/or later. In some implementations, a user/user account at a first organization can access the images and/or video, while a user/user account at a second organization different than the first organization cannot. In some implementations, both the user/user account at the first organization and the user/user account at the second organization can access the images and/or video. Each organization from the plurality of organizations can be associated with a public key and private key, as well as one or more users.

In the context of FIG. 2, org1 can be associated with a first organization, and org2 can be associated with a second organization (e.g., different than org1). The "org 1 private key" can be a cryptographic private key associated with the first organization, and the "org 2 private key" can be a private key associated with the second organization. The "user 1 password derived key" can be a key derived from a password associated with a first user, and the "user 2 password derived key" can be a key derived from a password associated with a second user (e.g., where the second user is different than the first user"). As shown in FIG. 2, the cloud compute device 240 stores "org1 private key" encrypted with "user1 password derived key", the "org1 private key" encrypted with "user2 password derived key", "org2 private key" encrypted with the "user2 password derived key", and/or the like. A process for storing a private key associated with an organization and encrypted with a user password derived key is also discussed with respect to FIG. 5. In some implementations, "org1 private key" is encrypted with "user1 password derived key" prior to the process discussed with respect to FIG. 3.

"Org 1 public key" can be a public key associated with (e.g., keypair of) the "org1 private key". "Org2 public key" can be a public key associated with (e.g., keypair of) the "org2 private key." As shown in FIG. 2, the cloud compute device 240 stores "org1 public key" and "org2 public key".

As shown in FIG. 2, the cloud compute device 240 also stores "media key1" encrypted with the "org1 public key", "media key2" encrypted with the "org1 public key", "media key234" encrypted with the "org2 public key", and/or the like. In some implementations, a media key is a symmetric key.

The "user1 password derived key" can any type of password that can be derived from the first user, such as a biometric, a login password, a profile identifier, and/or the like. Also as shown in FIG. 2, the camera 220 includes a representation of the "org1 public key". The camera 220 also includes a representation of "video_segment 1" encrypted with the "media key1". As shown in FIG. 2, the user compute device 200 stores the "user1 password derived key".

Figure 3:
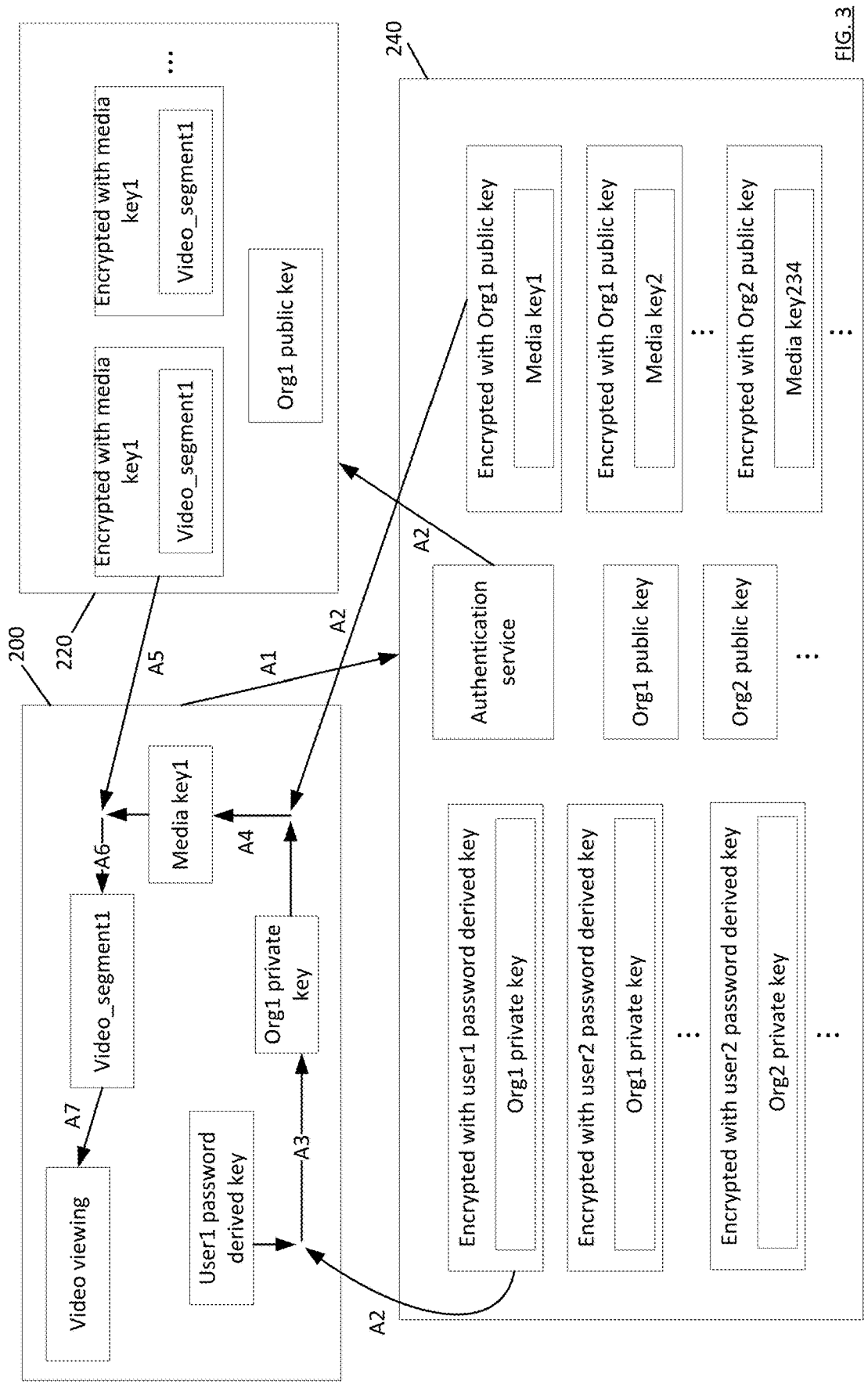
FIG. 3 shows a workflow illustrating how a user compute device can access a video captured by a sensor, according to an embodiment

FIG. 3 shows a workflow illustrating how a user compute device can access a video captured by a sensor, according to an embodiment. FIG. 3 shows the various data from FIG. 2 and how they can be exchanged/modified to enable the user compute device 200 to view a video captured by camera 220.

At (A1), a signal representing a request for a video is sent from user compute device 200 to cloud compute device 240. In some instances, a user may use user compute device 200 to request the video (e.g., via a website, native application, and/or the like). In some instances, the request is sent via a user account (e.g., that a user has logged into at user compute device 200).

At (A2), user permissions for the user account are checked at "authentication service." For instance, the "authentication service" can verify that the user account can access the requested video. In some implementations, the user may log into the user account at user compute device 200, and the request at (A1) can also include indications of the user account's permissions (e.g., credentials, a token, etc.) indicating that the request is permissible for the user account. In some implementations, "authentication service" can use a list (e.g., look up table) indicating permissions that different user accounts have. As another example, "authentication service" can require a token to be received (e.g., along with the request at (A1)) that indicates the user account has permission prior to granting access to otherwise secure sensor data. Additionally, the "media key1" encrypted with the "org1 public key" is sent from cloud compute device 240 to user compute device 200. Additionally, the "org1 private key" encrypted with "user1 password derived key" is sent from cloud compute device 240 to user compute device 200. In some instances, (A2) occurs automatically in response to (A1) (e.g., without requiring human intervention). In some instances, the "authentical service" is not performed.

At (A3), the "org1 private key" encrypted with the "user1 password derived key" received by user compute device 200 at (A2) from cloud compute device 240 is decrypted using the "user1 password derived key" stored at user compute device 200 to obtain the "org1 private key" (that is not encrypted with the "user1 password derived key"). At (A4), the "org1 private key" is used to decrypt the "media key1" encrypted with the "org1 public key" to obtain the "media key1" (that is not encrypted with the "org1 public key").

At (A5), the "video_segment1" encrypted with the "media key1" is received at user compute device 200. In some instances and/or alternative implementations, the "video_segment1" encrypted with "media key1" is sent from camera 220 to cloud compute device 240, then from cloud compute device 240 to user compute device 200. In some instances and/or alternative implementations, the "video_segment1" encrypted with "media key1" is sent from camera 220 to user compute device 200 without sending to cloud compute device 240.

At (A6), the "media key1" is used to decrypt the "video segment" encrypted with the "media key1" to obtain the "video_segment1". At (A7), the "video segment1" is displayed at user compute device 200.

A process similar to that described with respect to FIG. 3 can be repeated for other videos, other sets of information, other user compute devices, other users, and/or the like. For example, a "user2 password derived key" may be used to decrypt the "org2 private key" encrypted with "user2 password derived key", and the "org2 private key" can be used to decrypt the "media key234" encrypted with "org2 public key" to obtain "media key234" (where the "media key234" can be used to encrypt anything encrypted using the "media key234", such as another video segment).

Note that cloud compute device 240 cannot access the "video_segment1" because cloud compute device does not have the "media key1." The "media key1" is encrypted with the "org1 public key" at cloud compute device 240, and the "org1 private key" that can be used to obtain the "media key1" can only be accessed using the "user1 password derived key" stored at user compute device 200.

Figure 4:
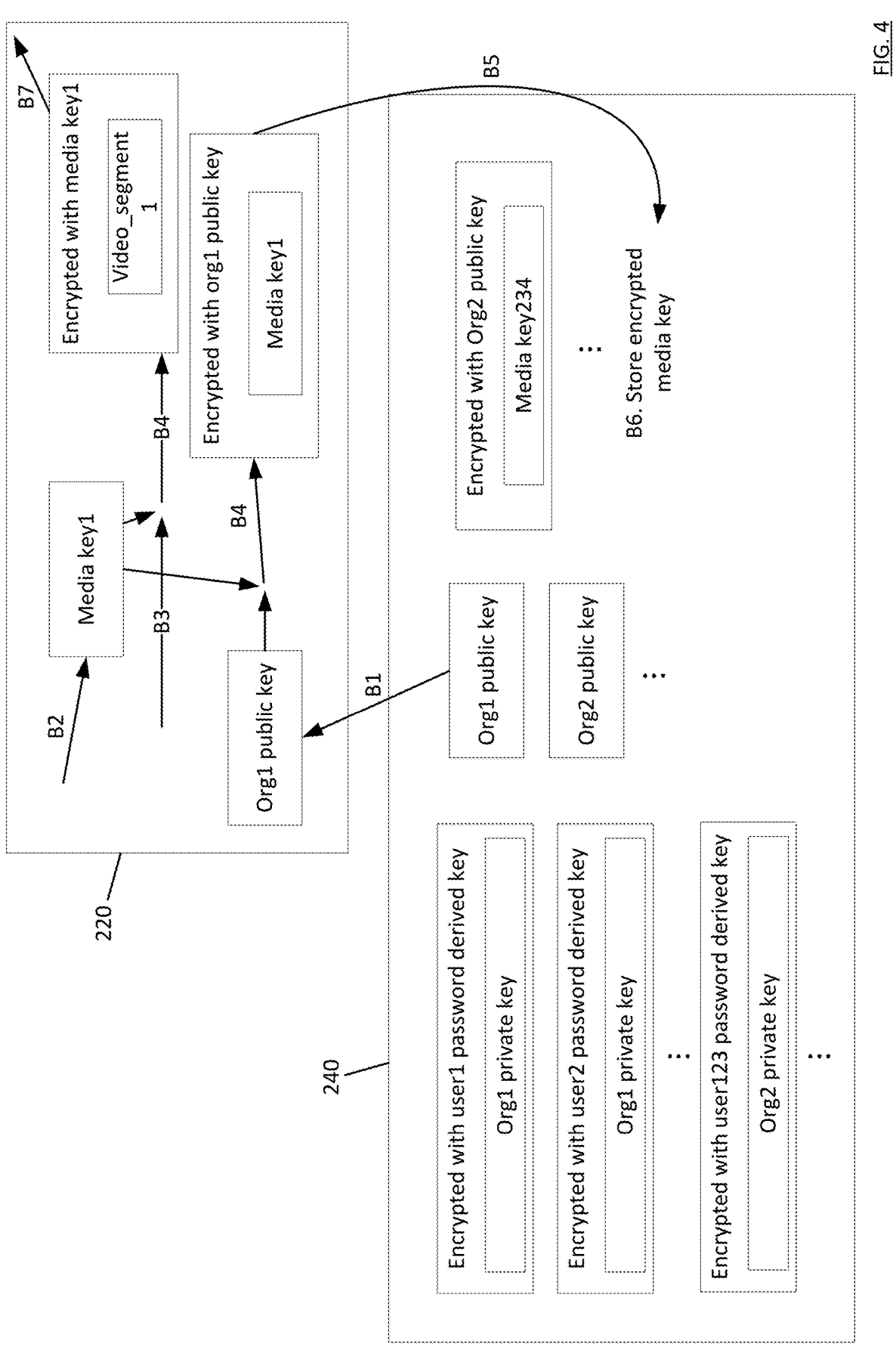
FIG. 4 shows a workflow illustrating how a camera can generate a video segment with a media key, according to an embodiment.

FIG. 4 shows a workflow illustrating how the camera 220 can generate the "video_segment1" encrypted with the "media key1", according to an embodiment. In some implementations, the process discussed with respect to FIG. 4 occurs prior to the process discussed with respect to FIGS. 2 and/or 3.

At (B1), the "org1 public key" is sent from cloud compute device 240 to camera 220 in response to the camera 220 sending a signal indicating a request for the "org1 public key" (e.g., the camera 220 sends a request to register at the cloud compute device 240"). At (B2), the "media key1" is generated at camera 220 by camera 220 (e.g., using a symmetric key generation technique). At (B3), video (e.g., live stream) captured by camera 220 is received (e.g., at a processor, such as processor 122). The video can be any video, such as security footage, a lecture, a sporting event, and/or the like. In some implementations, a predetermined amount of video is captured (e.g., pre-selected by a user or by a schedule), and the predetermined amount of video becomes "video_segment1."

At (B4), the video from (B3) is encrypted using the "media key1" to generate the "video_segment1" encrypted with the "media key1." Additionally, the "media key1" is encrypted using the "org1 public key" to generate the "media key1" encrypted with the "org1 public key."

At (B5), the "media key1" encrypted with the "org1 public key" is sent from camera 220 to cloud compute device 240. At (B6), the "media key1" encrypted with the "org1 public key" is stored at cloud compute device 240. At (B7), the "video_segment1" encrypted with the "media key1" can be stored at camera 220.

Figure 5:
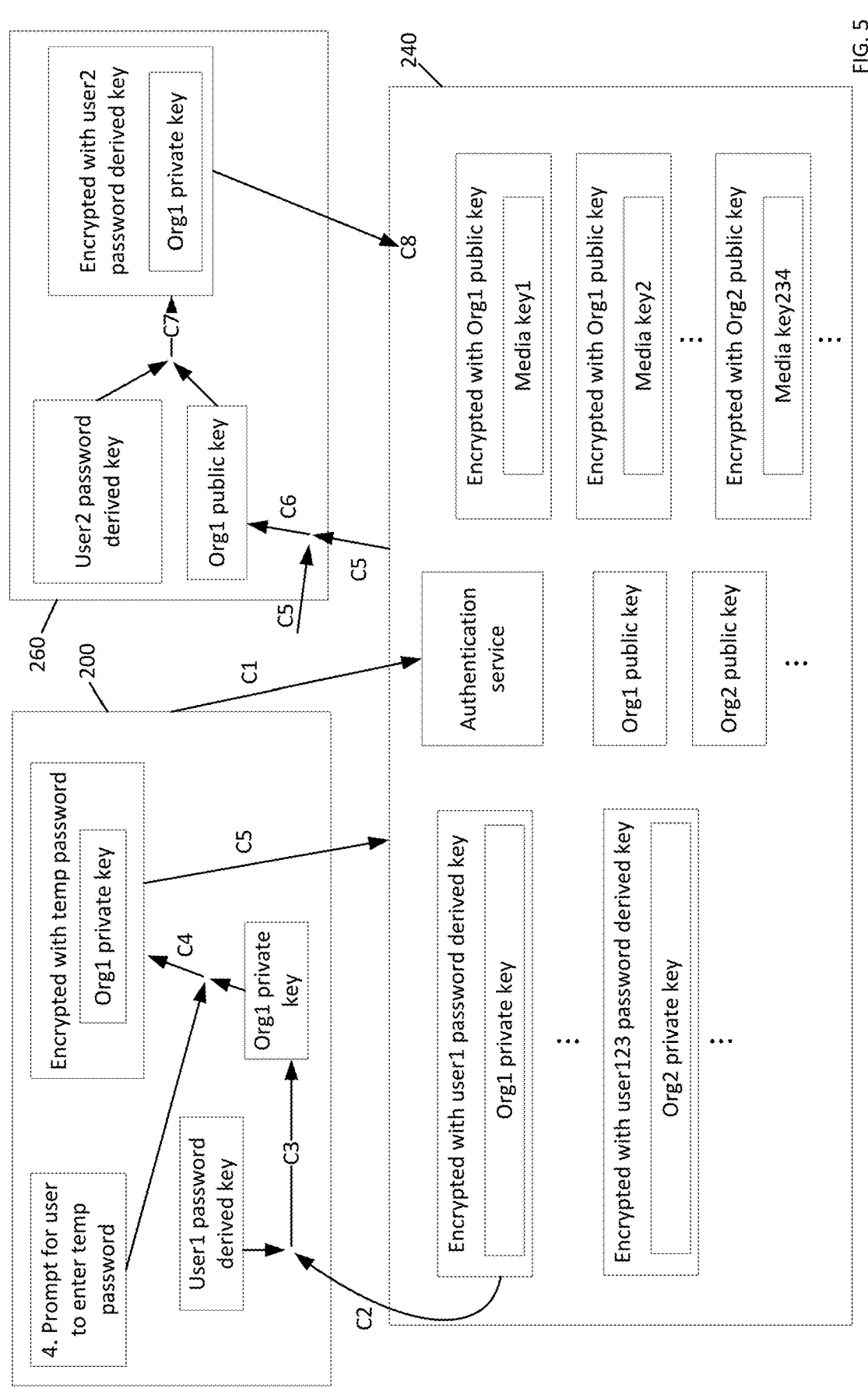
FIG. 5 shows a workflow illustrating how an additional user and/or user account can be included in a set of users/user accounts associated with an organization that can access otherwise encrypted sensor data, according to an embodiment.

FIG. 5 shows a workflow illustrating how an additional user/user account can be included in a set of users/user accounts associated with an organization that can access otherwise encrypted sensor data, according to an embodiment. Upon being invited to the organization, the invitee may then be able to access data captured by sensor 220.

At (C1), a signal indicating a request to invite an additional user (e.g., second user) is sent from user compute device 200 to cloud compute device 240. In some instances, a user (e.g., first user) is using a user account at user compute device 200 that has permission to invite additional users when the request at (C1) is sent from user compute device 200 to cloud compute device 240. In some implementations, the "authentication service" can be performed to check user permissions for the user account (e.g., to verify that the user account can invite additional users). In some implementations, the "authentication service" is not performed.

At (C2), the "org1 private key" encrypted with "user1 password derived key" is sent from cloud compute device 240 to user compute device 200. In some implementations, (C2) occurs after (e.g., automatically in response to and without requiring additional human intervention) the "authentication service" is successful (e.g., after the "authentication service" has verified that the user account can invite other users). At (C3), the "org1 private key" encrypted with "user1 password derived key" is decrypted using the "user1 password derived key" to obtain the "org1 private key."

At (C4), the user associated with the user compute device 200 is prompted to enter a temporary password, also referred to as the "temp password." The "temp password" could include, for example, letters, numbers, symbols, and/or the like. In some implementations, the "temp password" is generated automatically (e.g., without user input) by user compute device 200 (e.g., in response to (C1)). Additionally, the "temp password" can be used to encrypt the "org1 private key" to generate the "org1 private key" encrypted with the "temp password."

At (C5), the "org1 private key" encrypted with the "temp password" is sent from user compute device 200 to cloud compute device 240, and stored at cloud compute device 240. The user associated with the user compute device 200 can also share the "temp password" with the second user (i.e., invitee) associated with the second user compute device 260 (e.g., via email, via text, in person, and/or the like). When the second user uses the "temp password" (e.g., to log in at a portal), the "org1 private key" encrypted with the "temp password" can be sent from cloud compute device 240 to second user compute device 260.

At (C6), the "temp password" is used to decrypt the "org1 private key" encrypted with the "temp password" to obtain the "org1 private key." At (C7), the "org1 private key" is encrypted using the "password derived user2 key" to generate the "org1 private key" encrypted with the "user2 password derived key." At (C8), the "org1 private key" encrypted with the "user2 password derived key" is sent from the second user compute device 260 to the cloud compute device 240, and stored at cloud compute device 240. That way, if the second user compute device 260 is later used to request, for example, a video segment, the "org1 private key" encrypted with the "user2 password derived key" can be used (similar to the process described with respect to FIG. 3 except with respect to user2 info).

Figure 6:
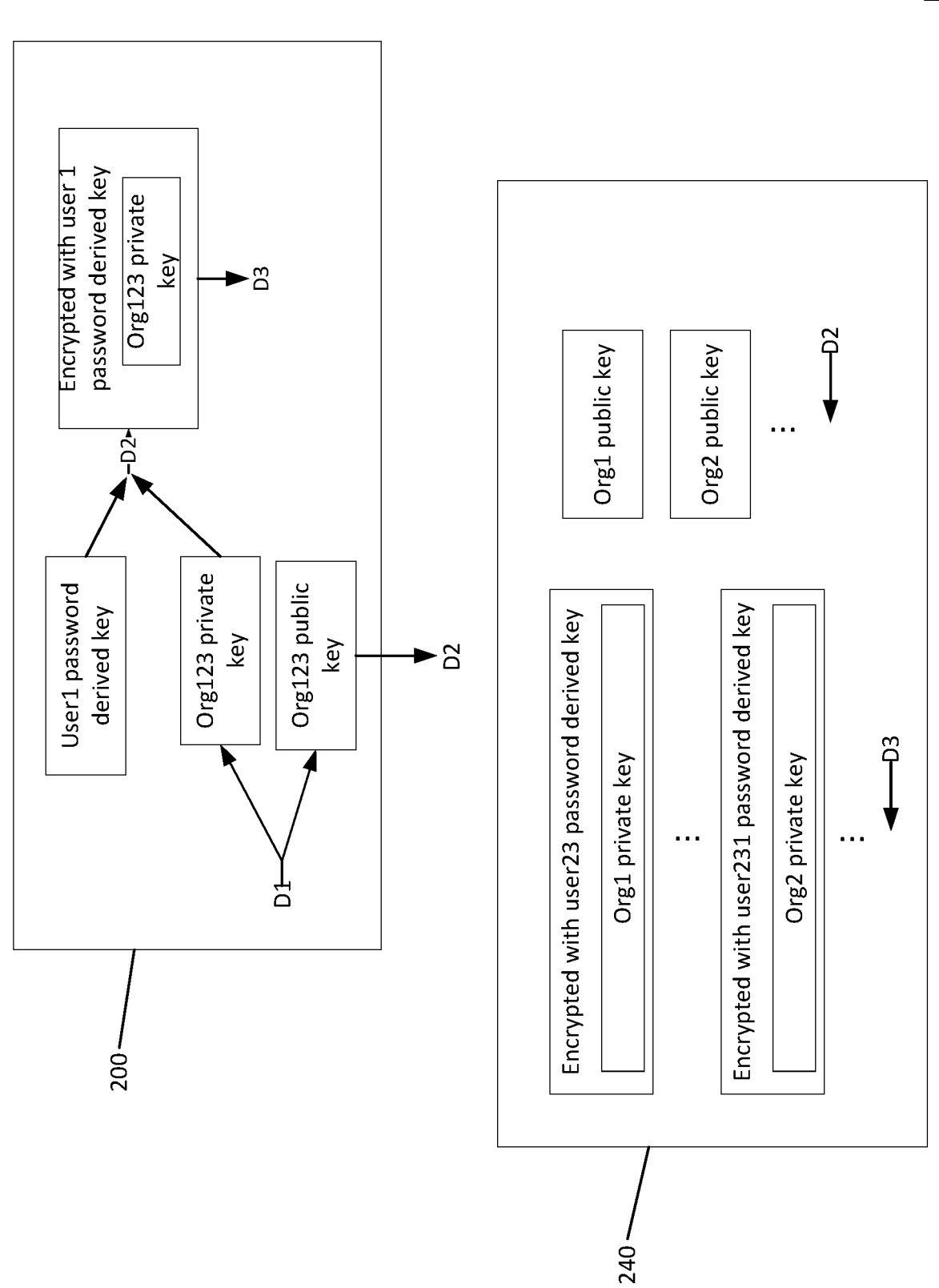
FIG. 6 shows a workflow illustrating how an additional organization and user account can be created at a cloud compute device, according to an embodiment.

FIG. 6 shows a workflow illustrating how an additional organization and user account can be created at cloud compute device 240, according to an embodiment. Recall that cloud compute device 240 can manage user access to data captured by a sensor(s) for multiple different users and/or organizations. For example, the cloud compute device 240 can manage access to sensor data for not only a first organization and a second organization, but also for a third organization (e.g., org123). In some implementations, the sensor data is accessible by a single organization. In some implementations, the sensor data is accessible by multiple organizations.

At (D1), an "org123 private key" and "org123 public key" are generated at user compute device 200 using cryptographic techniques. At (D2), a "org123 private key" encrypted with "user1 password derived key" is generated by encrypting the "org123 private key" with the "user1 password derived key." The "user1 password derived key" can be, for example, derived at user compute device 200 from a password known by user compute device 200. At (D3), the "org123 private key" encrypted with the "user1 password derived key" is sent from user compute device 200 to cloud compute device 240 for storage. In some implementations, the process described with respect to FIG. 6 can be performed prior to user1 of org123 being able to access sensor data (e.g., similar to process discussed with respect to FIG. 3), invite another user (e.g., similar to process discussed with respect to FIG. 5), and/or sharing a link (e.g., similar to process discussed with respect to FIGS. 7 and/or 8).

Figure 7:
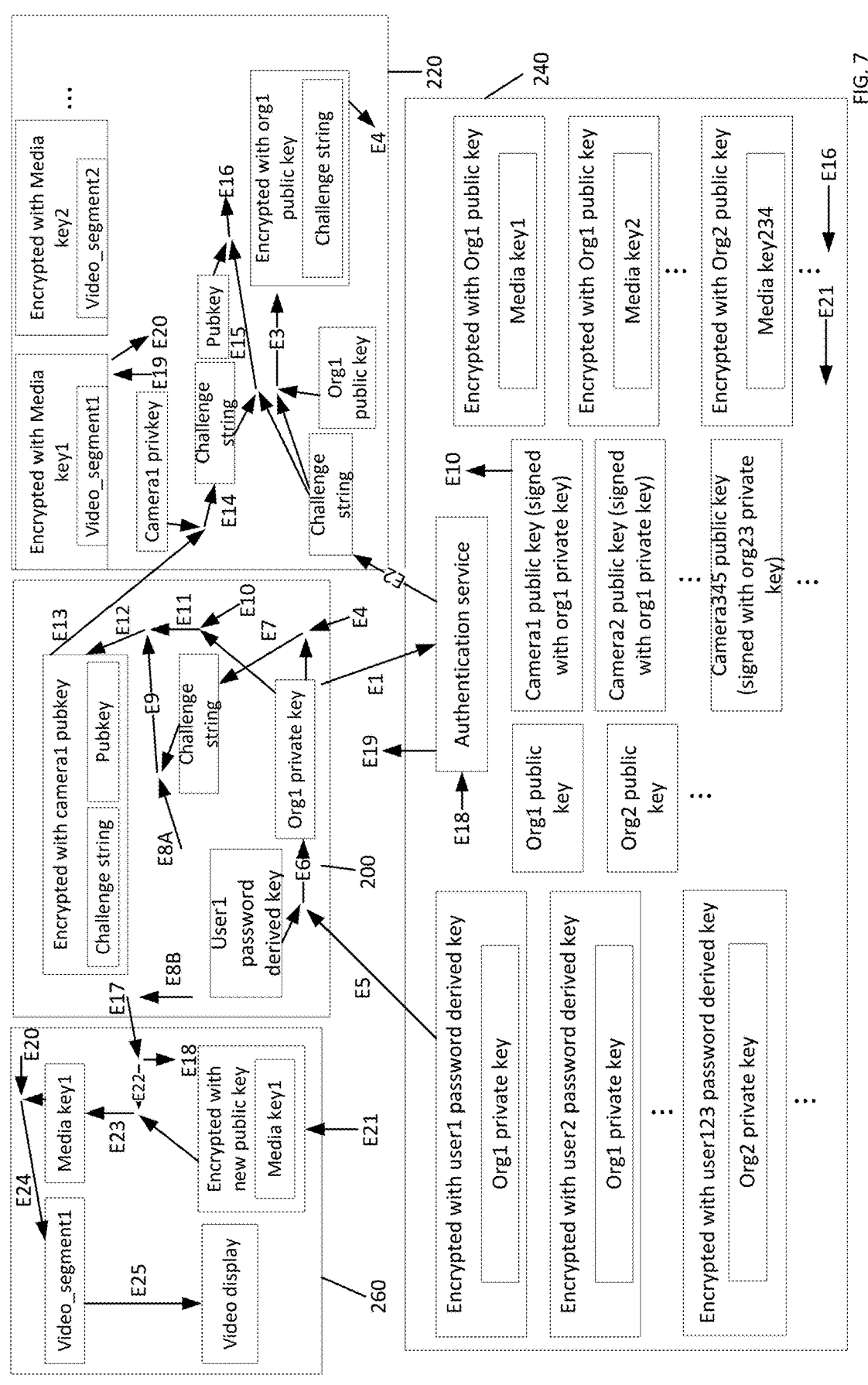
FIG. 7 shows a workflow illustrating sharing a link that can be used to access an otherwise encrypted video, according to an embodiment.

FIG. 7 shows a workflow illustrating sharing a link that can be used to access an otherwise encrypted video (e.g., between a user account that can access an encrypted version of the encrypted video and a user account that cannot), according to an embodiment. At (E1), a signal representing a request to share a link is sent from user compute device 200 to cloud compute device 240. In some implementations, user permissions for the user account are checked at "authentication service" (e.g., to verify that the user account can access the requested video and/or share a link).

At (E2), a signal representing the request to share the link is sent from cloud compute device 240 to camera 220. In response to receiving the request to share the live link from the cloud compute device 240, the camera 220 can generate a "challenge string." The "challenge string" is a string, though in other implementations, any other combination of letters, numbers, symbols, and/or the like can be used. In some implementations, "challenge string" is randomly generated. In some implementations, "challenge string" is specific to the user account requesting to share the link at (E1) (e.g., such that other requests by the same user account would result in the same challenge string being generated). In some implementations, "challenge string" is specific to camera 220 (e.g., such that other requests to camera 220 would result in the same challenge string being generated).

At (E3), the "challenge string" is encrypted with the "org1 public key" to generate the "challenge string" encrypted with the "org1 public key." At (E4), the "challenge string" encrypted with the "org1 public key" is received by the user compute device 200. In some instances or alternative implementations, the "challenge string" encrypted with the "org1 public key" is sent from camera 220 to cloud compute device 240, then from cloud compute device 240 to user compute device 200. In some instances or alternative implementations, the "challenge string" encrypted with the "org1 public key" is sent from camera 220 to user compute device 200 without sending to cloud compute device 240.

At (E5), the "org1 private key" encrypted with the "user1 password derived key" is sent from cloud compute device 240 to user compute device 200. At (E6), the "password derived user1 key" is used to decrypt the "org1 private key" encrypted with the "user1 password derived key" and obtain the "org1 private key."

At (E7), the "org1 private key" is used to decrypt the "challenge string" encrypted with the "org1 public key" to obtain the "challenge string." At (E8A), a random public key is generated, also referred to as the "pubkey." At (E8B), a random private key is generated, also referred to as the "privkey." The "pubkey" and the "privkey" are a cryptographic keypair.

At (E9), the "challenge string" and the "pubkey" are concatenated. At (E10), a "cameral public key", which has been digitally signed with "org 1 priv key" is sent from cloud compute device 240 to user compute device 200. Note that the "cameral public key," which has been digitally signed with "org 1 priv key," can be defined when a user at user compute device 200 registers camera 220 at cloud compute device 240. At (E11), the "org1 private key" is compared to the "cameral public key" (that has been signed digitally with org1 private key) (e.g., to check if they match). If the comparison is successful, the "cameral public key" is extracted from the "cameral public key" digitally signed with "org 1 priv key."

At (E12), the "cameral public key" is then used to encrypt the concatenation of the "challenge string" and the "pubkey" to generate the concatenation of the "challenge string" and the "pubkey" encrypted with the "cameral pubkey." At (E13), the concatenation of the "challenge string" and the "pubkey" encrypted with the "cameral pubkey" is sent from user compute device 200 to camera 220.

At (E14), a "camera 1 privkey", which is a private key associated with (e.g., generated at) camera 220, is used to decrypt the concatenation of the "challenge string" and the "pubkey" encrypted with the "cameral pubkey" to obtain the concatenation of the "challenge string" and the "pubkey." At (E15), the "challenge string" generated at (E2) is compared to the "challenge string" from the concatenation of the "challenge string" and the "pubkey" to verify that they match.

Matching can indicate, for instance, that user compute device 200 successfully received "camera1 public key" from cloud compute device 240 at (E10).

At (E16), the "pubkey" from the concatenation of the "challenge string" and the "pubkey" is sent from camera 220 to cloud compute device 240. In some implementations, the "pubkey" from the concatenation of the "challenge string" and the "pubkey" is stored at camera 220 (e.g., as a secondary public key and optionally with a predetermined expiration time). In some implementations, after completing (E16), all new media keys created by camera 220 will be encrypted and/or stored with "org1 public key" and "pubkey." For example, the "media key1" can be encrypted with the "pubkey."

At (E17), a link is generated at user compute device 200 and sent to second user compute device 260 without sending to cloud compute device 240 (e.g., via email, via text, in person, and/or the like). The link includes a representation of the "privkey" generated at (E8B). The link can also include a representation of access permissions, the access permissions indicating that the compute device and/or user account generating the link at (E17) has permission to do so.

At (E18), a representation of the access permissions from the link generated at (E17) is sent from second user compute device 260 (and/or user compute device 200) to cloud compute device 240 (e.g., without sending the "privkey"). In some implementations, the "authentication service" can verify that the access permissions is acceptable prior to beginning (E19).

At (E19), the cloud compute device 240 sends a representation of a request for the "video_segment1" encrypted with the "media key1" to camera 220. At (E20), the "video_segment1" encrypted with the "media key1" is sent from camera 220 to second user compute device 260.

At (E21), the "media key1" encrypted with the "pubkey" is sent from cloud compute device 240 to second user compute device 260. At (E22), the "privkey" is extracted from the link generated at (E17).

At (E23), the "privkey" is used to decrypt the "media key1" encrypted with the "pubkey" to obtain the "media key1". At (E24), the "video_segment1" encrypted with the "media key1" is decrypted using the "media key1" to obtain the "video_segment1". At (E25), a representation of "video_segment1" is displayed.

In some implementations, after (E8A) and (E8B), if link with permissions for historical footage is being created, all media keys encrypted with the "org1 public key" can also be sent to the user compute device 200, where all the media keys encrypted with the "org1 public key" will be decrypted into each media key, re-encrypted using the "pubkey" from (E8A) and sent to the cloud compute device 240 for storage (e.g., with a predetermined expiration time).

In some implementations, if the request at (E1) is to share multiple cameras, steps (E1)-(E7) can be performed on a per camera basis, generate only one "pubkey" and "privkey" at (E8A) and (E8B), then perform (E9)-(E13) on a per camera basis.

In some implementations, sharing permissions (and links) can be revoked at any time by the first user. For example, a request to revoke sharing permissions can be sent from user compute device 200 to cloud compute device 240. Thereafter, the cloud compute device 240 can revoke the link in the permission to access at (E16), delete the media keys encrypted with the "pubkey", and/or send a message to camera 220 to stop encrypting media keys with the "pubkey."

Figure 8:
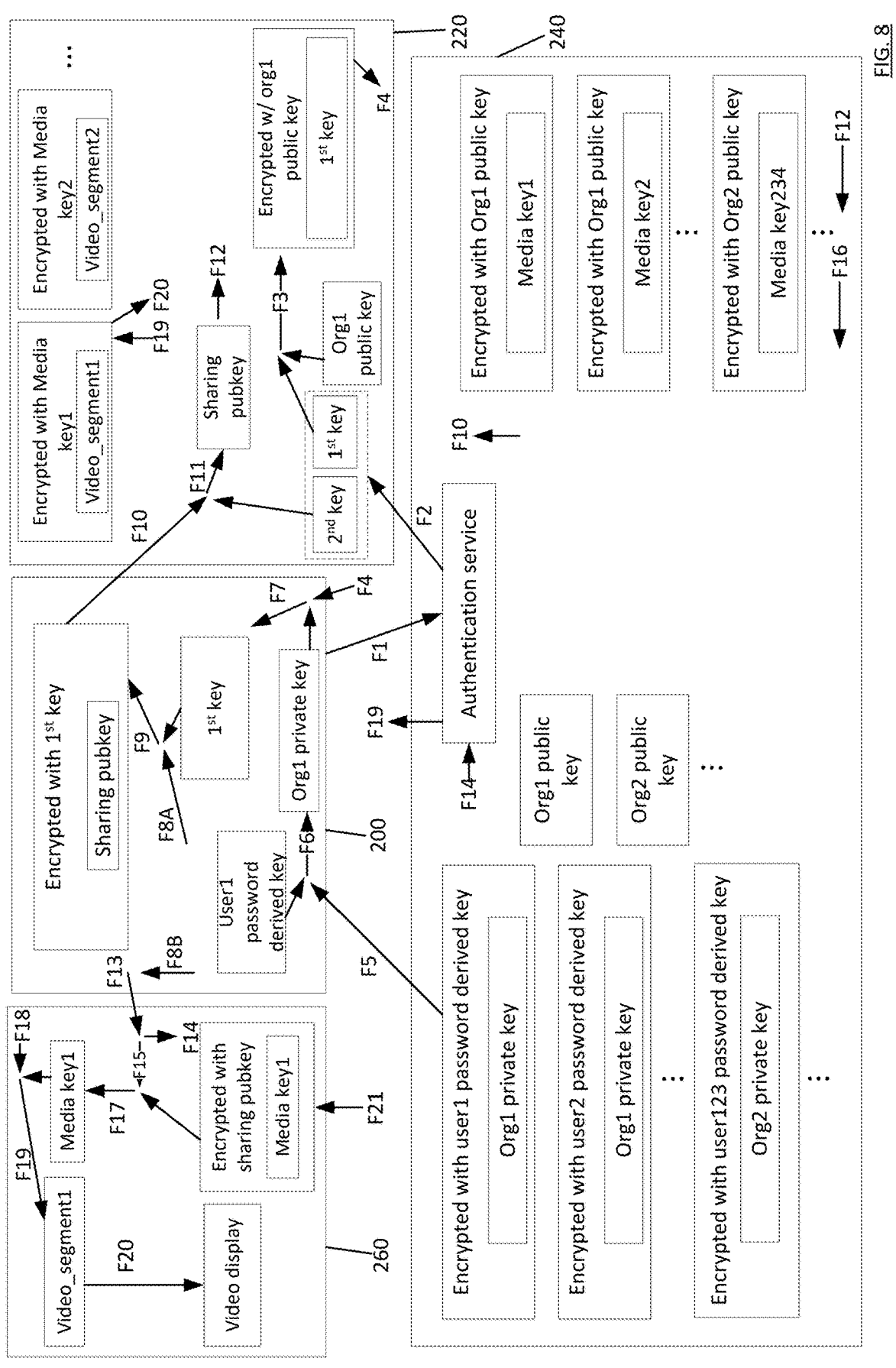
FIG. 8 shows a workflow illustrating another way of sharing a link that can be used to access an otherwise encrypted video, according to an embodiment.

FIG. 8 shows a workflow illustrating another way of sharing a link that can be used to access an otherwise encrypted video, according to an embodiment. At (F1), a signal representing a request to share a link is sent from user compute device 200 to cloud compute device 240. In some implementations, user permissions for the user account are checked at "authentication service" (e.g., to verify that the user account can access the requested video and/or share a link).

At (F2), a signal representing the request to share the link is sent from cloud compute device 240 to camera 220. In response to receiving the request to share the live link from the cloud compute device 240, the camera 220 can generate a "$1^{st}$ key" and a "$2^{nd}$ key" keypair. In some implementations, the "$1^{st}$ key" is a symmetric key or public key, and the "$2^{nd}$ key" is a symmetric key or private key. In some implementations, the "$1^{st}$ key" and the "$2^{nd}$ key" can be stored at camera 220 (e.g., with a predetermined expiration time).

At (F3), the "$1^{st}$ key" is encrypted with the "org1 public key" to generate the "$1^{st}$ key" encrypted with the "org1 public key." At (F4), the "$1^{st}$ key" encrypted with the "org1 public key" is received by the user compute device 200. In some implementations, the "$1^{st}$ key" encrypted with the "org1 public key" is sent from camera 220 to cloud compute device 240, then from cloud compute device 240 to user compute device 200. In some implementations, the "$1^{st}$ key" encrypted with the "org1 public key" is sent from camera 220 to user compute device 200 without sending to cloud compute device 220.

At (F5), the "org1 private key" encrypted with the "user1 password derived key" is sent from cloud compute device 240 to user compute device 200. At (F6), the "password derived user1 key" is used to decrypt the "org1 private key" encrypted with the "user1 password derived key" and obtain the "org1 private key."

At (F7), the "org1 private key" is used to decrypt the "symmetric key or public key" encrypted with the "org1 public key" to obtain the "1' key." At (F8A), a random sharing public key is generated, also referred to as a "sharing pubkey." At (F8B), a random sharing private key is generated, also referred to as the "privkey." The "sharing pubkey" and the "privkey" are a keypair. In some implementations, the keys generated at (F8A) and (F8B) can be symmetric keys.

At (F9), the "$1^{st}$ key" is used to encrypt the "sharing pubkey" to generate the "sharing pubkey" encrypted with the "$1^{st}$ key." At (F10), the "sharing pubkey" encrypted with the "$1^{st}$ key" is received at camera 220 (e.g., directly from user compute device 200; from cloud compute device 240 after cloud compute device 240 has received from user compute device 200).

At (F11), the "$2^{nd}$ key" is used to decrypt the "sharing pubkey" encrypted with the "$1^{st}$ key" to obtain the "sharing pubkey." At (F12), the "sharing pubkey" is saved at camera 220 and/or sent to cloud compute device 240 for saving. In some implementations, the "sharing pubkey" expires after a predetermined period of time. For example, the "media key1" can be encrypted with the "sharing pubkey."

At (F13), a link is generated at user compute device 200 and sent to second user compute device 260 (e.g., via email, via text, in person, and/or the like). The link includes a representation of the "privkey" generated at (F8B). The link can also include a representation of access permissions, the access permissions indicating that the compute device and/or user account generating the link at (F13) has permission to do so.

At (F14), a representation of the access permissions from the link generated at (F13) is sent from second user compute device 260 (and/or user compute device 200) to cloud compute device 240 (e.g., without sending the "privkey"). At (F15), the "privkey" is extracted from the link generated at (F13).

At (F16), the "media key1" encrypted with the "sharing pubkey" is sent from camera 220 to second user compute device 260. At (F17), the "privkey" is used to decrypt the "media key1" encrypted with the "sharing pubkey" to obtain the "media key1."

At (F18), the "video_segment1" encrypted with the "media key1" is received at second user compute device 260 (e.g., from camera 220 or cloud compute device 240). At (F19), the "media key1" is used to decrypt the "video_segment1" encrypted with the "media key1" to obtain the "video_segment1." At (F20), the "video_segment1" is displayed.

In some implementations, if the request at (F1) is to share multiple cameras, steps (F1)-(F7) can be performed on a per camera basis, generate only one "sharing pubkey" and "privkey" at (F8A) and (F8B), then perform (F9)-(F13) on a per camera basis.

In some implementations, sharing permissions (and links) can be revoked at any time by the first user. For example, a request to revoke sharing permissions can be sent from user compute device 200 to cloud compute device 240. Thereafter, the cloud compute device 240 can revoke the link in the permission to access at (F16), delete the media keys encrypted with the "sharing pubkey", and/or send a message to camera 220 to stop encrypting media keys with the "sharing pubkey."

In some implementations, a user compute device can include (e.g., at memory) a representation of a device machine key. The device machine key can any type of key that can be derived from the user compute device 200, such as a serial number, random unique identifier, and/or the like. Although at least some of the discussions related to FIGS. 2-8 used a user password derived key (e.g., "user1 password derived key", "user2 password derived key", etc.), in some implementations, the device machine key can be used instead and/or additionally.

Figure 9:
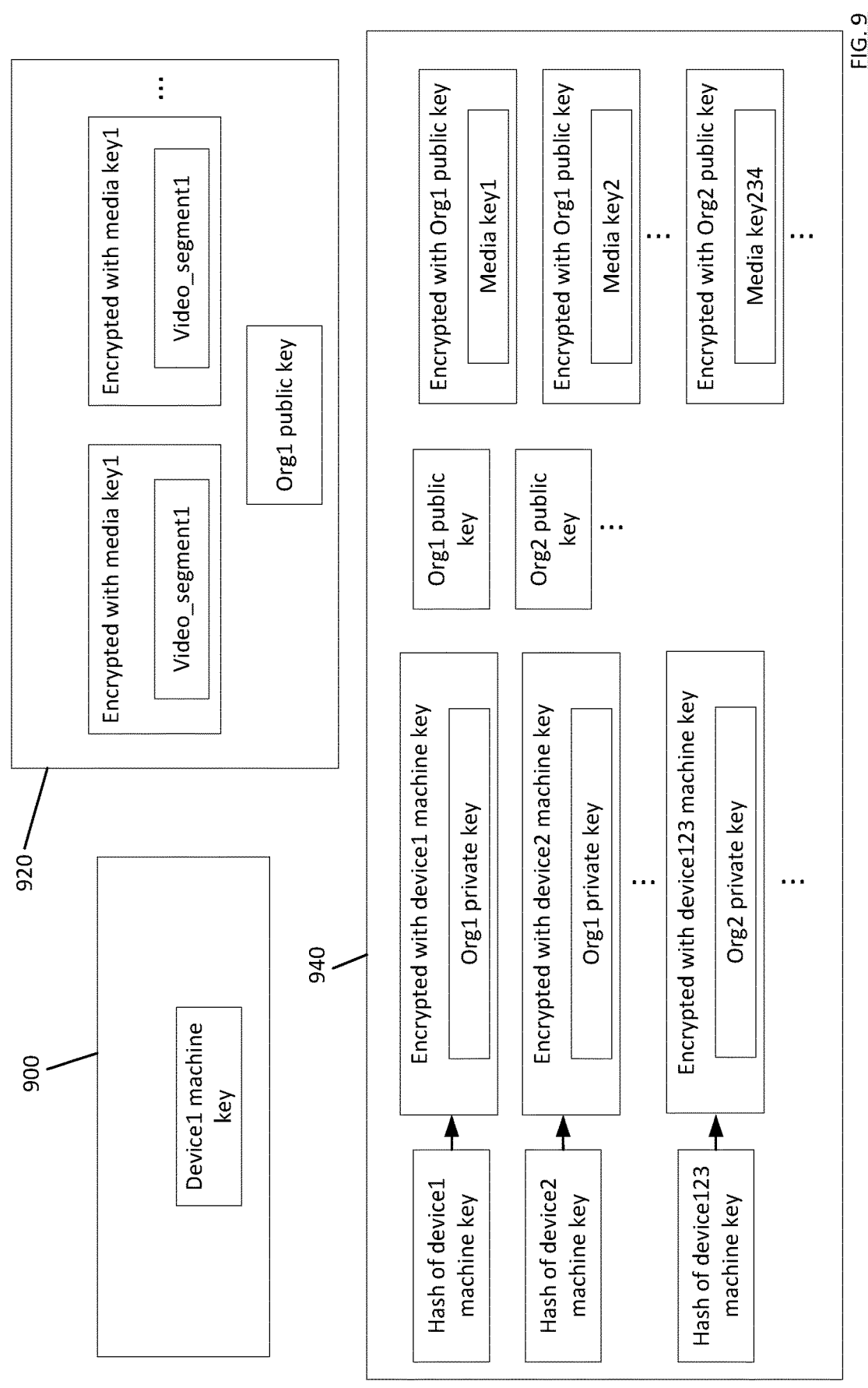
FIG. 9 shows a block diagram of a system that includes a user compute device, camera, and cloud compute device, according to an embodiment.

FIG. 9 shows a block diagram of a system that includes a user compute device 900 (e.g., user compute device 100), camera 920 (e.g., sensor 120), and cloud compute device 940 (e.g., cloud compute device 160), each operatively coupled to one another (e.g., via network 140). The cloud compute device 940 can be associated with multiple organizations. One or more users from each organization may desire to access (e.g., view, download, open, etc.) sensor data collected by a sensor (e.g., camera 920 and/or a sensor not shown in FIG. 9). Each organization from the multiple organizations can be associated with a public key and a private key, as well as one or more users.

As shown in FIG. 9, the cloud compute device 940 includes "org1 private key" encrypted with "device1 machine key", the "org1 private key" encrypted with "device2 derived key", "org2 private key" encrypted with the "device123 machine key", and/or the like. In this context, org1 can be associated with a first organization, and org2 can be associated with a second organization (e.g., different than org1, the first organization). The "org 1 private key" can be a private key associated with the first organization, and the "org 2 private key" can be a private key associated with the second organization. The "device1 machine key" can be a key derived from a password associated with a compute device associated the first user, and the "browswer2 machine key" can be a key derived from a compute device associated with the second user (e.g., where the second user is different than the first user").

As shown in FIG. 9, the cloud compute device 940 also includes "org1 public key" and "org2 public key". "Org 1 public key" can be a public key associated with (e.g., cryptographic keypair of) the "org1 private key". "Org2 public key" can be a public key associated with (e.g., cryptographic keypair of) the "org2 private key."

As shown in FIG. 9, the cloud compute device 940 also includes "media key1" encrypted with the "org1 public key", "media key2" encrypted with the "org1 public key", "media key234" encrypted with the "org2 public key", and/or the like.

As shown in FIG. 9, the user compute device 900 includes a representation of the "device1 machine key". The "device1 machine key" can any type of device1 machine identifier that can be derived from the user compute device 900. In some implementations, the "device1 machine key" is associated with a browser associated with (e.g., running on, installed at) compute device 900, but does not need to be. Also as shown in FIG. 9, the camera 920 includes a representation of the "org1 public key". The camera 920 also includes a representation of "video_segment 1" encrypted with the "media key1".

The system shown at FIG. 9 can be used to carry out similar functions as those described with respect to FIGS. 3-8. For example, the processes discussed with respect to FIGS. 3, 4, 6, 7, or 8 can be modified such that any user password derived cryptographic keys (e.g., "user1 password derived cryptographic key") is replaced with a browser machine cryptographic key (e.g., "browser1 machine cryptographic key").

Figure 10:
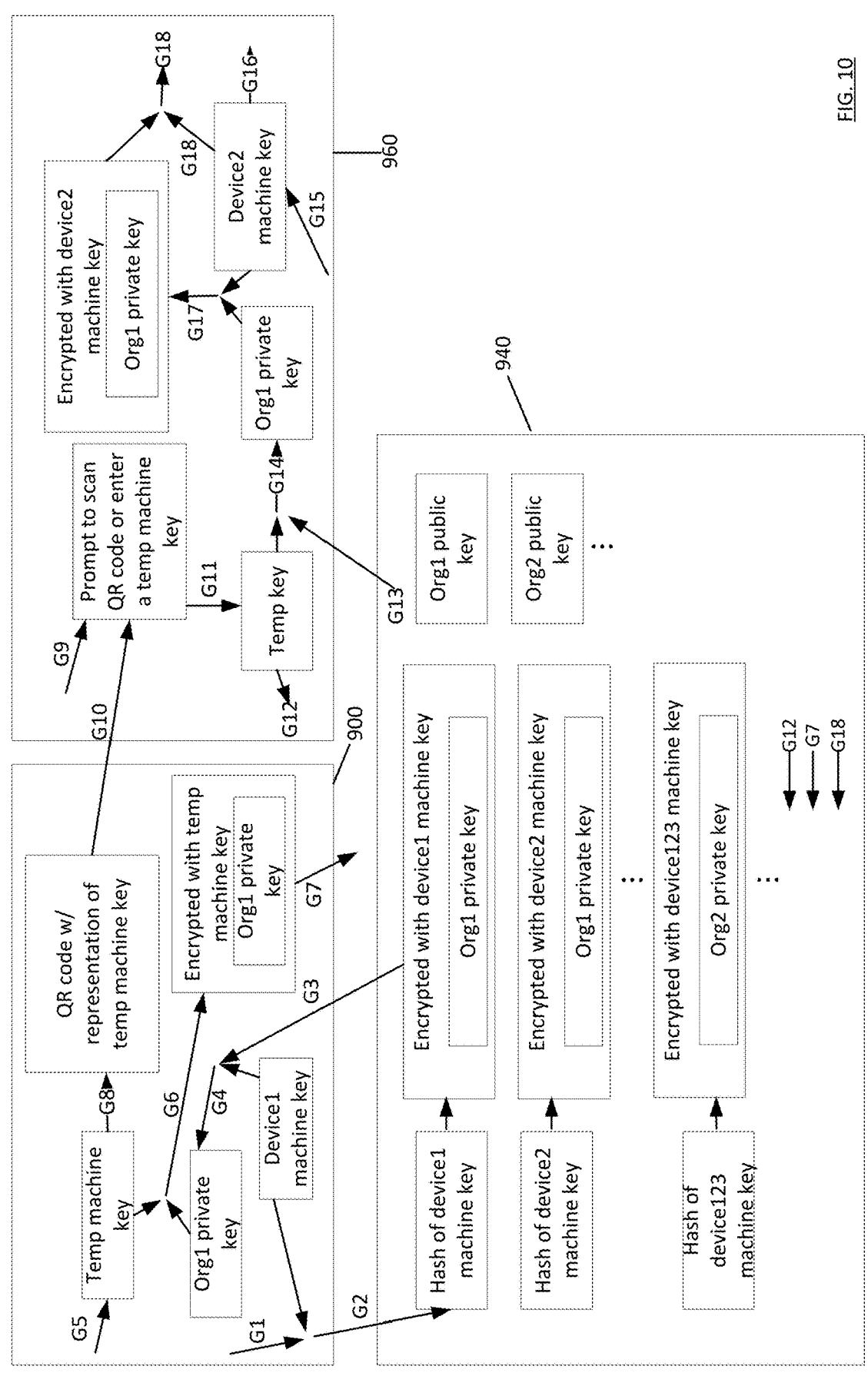
FIG. 10 shows a workflow illustrating how a user can login on a different compute device, according to an embodiment.

FIG. 10 shows a workflow illustrating how a user can login (e.g., to a portal to view sensor data) on a compute device different than (and optionally remote from) a user compute device, according to an embodiment. At (G1), a user uses user compute device 900 to request authorization of a second user compute device. A hash of the "device1 machine key" is sent with the request from user compute device 900 to cloud compute device 940.

At (G2), the request from (G1) is received by the cloud compute device 940 and matched to a copy of the "hash of device1 machine key" (e.g., that was previously received/stored at cloud compute device 940 prior to (G1) and (G2)). At (G3), the "org1 private key" encrypted with the "device1 machine key" is sent to user compute device 900 based on the "encrypted org1 private key" being associated with the "hash of device1 machine key."

At (G4), the "device1 machine key" is used to decrypt the "org1 private key" encrypted with the "device1 machine key" and obtain the "org1 private key." At (G5), a random key is generated, referred to as "temp machine key."

At (G6), the "temp machine key" is used to encrypt the "org1 private key" and generate the "org1 private key" encrypted with the "temp machine key." At (G7), the "org1 private key" encrypted with the "temp machine key" is received by cloud compute device 940 from user compute device 900. In some implementations, the "org1 private key" encrypted with the "temp machine key" is stored temporarily (e.g., less than a predetermined period of time). In some implementations, the "org1 private key" encrypted with the "temp machine key" is stored and/or associated with a hash of the "temp machine key".

At (G8), a representation of the "temp machine key" is output, such as a QR code that includes an indication of the "temp machine key." At (G9), the same user and/or a different user starts a login process on a second user compute device 960. For example, user compute device 900 may be a laptop associated with the user, and second user compute device 960 may be a smartphone associated with the user. (G8) and/or (G9) can be performed without involvement of the cloud compute device 240.

At (G10), the user can scan a QR code and/or enter the "temp machine key" in response to a prompt from second user compute device 960. At (G11), a "temp kye" is extracted from the QR code and/or the entered "temp machine key". At (G12), a request for the "org1 private key" encrypted with the "temp key", along with the hash of the "temp key", is sent from second user compute device 960 to cloud compute device 940 (e.g., for storage).

At (G13), the "org1 private key" encrypted with the "temp key" is sent from the cloud compute device 940 to the second user compute device 960. At (G14), the "temp key" is used to decrypt the "org1 private key" encrypted with the "temp key" to obtain the "org1 private key."

At (G15), a "device2 machine key" is generated at second user compute device 960. At (16), the "device2 machine key" is stored at second user compute device 960 (e.g., such that the "device2 machine key" persists after logout) or at a memory separate from and accessible by second user compute device 960.

At (G17), the "device2 machine key" is used to encrypt the "org1 private key" and generate the "org1 private key" encrypted with the "device2 machine key." At (G18), the "device2 machine key" is hashed, and (a) the hashed "device 2 machine key" and (b) the "org1 private key" encrypted with the "device2 machine key" are sent to cloud compute device 940 for storage. Note that, to revoke second user compute device's 960 access, the "org1 private key" encrypted with the "device2 machine key" is deleted (e.g., by cloud compute device 940 such that the cloud compute device 940 does not store the "org1 private key" encrypted with the "device2 machine key").

FIG. 11 shows a flowchart of a method 1100 accessing sensor data, according to an embodiment. In some implementations, method 1100 can be performed by a processor (e.g., processor 162 and/or a processor included in cloud compute device 240).

At 1101, a request for sensor data (e.g., "video_segment1" of FIG. 3) captured by a sensor (e.g., camera 220 of FIG. 3) is received from a compute device (e.g., user compute device 200 of FIG. 3) associated with (1) an organization and (2) a user account that is associated with the organization. The sensor data can be any type of sensor data, such as video, images, and/or the like. In some implementations, the sensor data can be any other type of data that is encryptable, such as a document or software application. At 1102, an encrypted private key (e.g. "org1 private key" encrypted with "user1 password derived key" of FIG. 3, or "org1 private key" encrypted with "device1 machine key" of FIG. 9) generated by encrypting a private key (e.g., "org1 private key" of FIG. 3) associated with the organization using an identifier key (e.g., "user1 password derived key" of FIG. 3, or "device1 machine key" of FIG. 9) is sent to the compute device to cause the compute device to decrypt the encrypted private key using the identifier key to obtain the private key after receiving the encrypted private key. At 1103, an encrypted media key (e.g., "media key 1" encrypted with "org1 public key" of FIG. 3) generated by encrypting a media key (e.g., "media key1 of FIG. 3) using a public key associated with the organization (e.g., "org1 public key" of FIG. 3) is sent to the compute device to cause the compute device to decrypt the encrypted media key using the private key to obtain the media key after receiving the encrypted media key. At 1104, the compute device is caused to receive encrypted sensor data (e.g., "video_segment1" encrypted with "media key1" of FIG. 3) that generated by encrypting the sensor data using the media key, to cause the compute device to, in response to receiving the encrypted sensor data, (1) decrypt the encrypted sensor data using the media key to obtain the sensor data and (2) output a representation of the sensor data.

In some implementations of method 1100, the identifier key is one of derived from a password associated with the user account (e.g., "user1 password derived key" of FIG. 3) or a machine key associated with the compute device (e.g., "device1 machine key" of FIG. 9).

Some implementations of method 1100 include: sending the public key associated with the organization to the sensor, to cause the sensor to (1) generate the media key, (2) encrypt the media key using the public key to generate the encrypted media key, and (3) encrypt the sensor data using the media key to generate the encrypted sensor data; and receiving, from the sensor, the encrypted media key.

In some implementations of method 1100, the identifier key is derived from a password associated with the user account, the request is a first request, the password is a first password, the compute device is a first compute device, the user account is a first user account, the encrypted private key is a first encrypted private key, and the method further comprises: receiving, from the first compute device, a second request associated with a second user account that is associated with a second compute device (e.g., second user compute device 260); receiving, from the first compute device, a second encrypted private key (e.g., "org1 private key" encrypted with "temp password" of FIG. 5) that was generated by the first compute device encrypting the private key using a second password (e.g., "temp password" of FIG. 5); sending, to the second compute device, the second encrypted private key, to cause the second compute device to (1) decrypt the second encrypted private key using the second password to obtain the private key and (2) encrypt the private key using a second key (e.g., "user2 password derived key" of FIG. 5) derived from a password associated with the second user account to generate a third encrypted private key (e.g., "org1 private key" encrypted with "user2 password derived key" of FIG. 5); receiving, from the second compute device, the third encrypted private key; and storing, in response to receiving the third encrypted private key, the third encrypted private key.

In some implementations of method 1100, the compute device is a first compute device, the identifier key is a first machine key associated with the first compute device, the encrypted private key is a first encrypted private key, and the method further comprises: receiving, from the first compute device, (1) a request to authorize a second compute device (e.g., second user compute device 960 of FIG. 10), and (2) a hashed first machine key (e.g., "hash of device1 machine key" of FIG. 10) that was generated by hashing the first machine key; identifying, based on the hashed first machine key, the first encrypted private key; sending, to the first compute device, the first encrypted private key to cause the first compute device to decrypt the first encrypted private key using the first machine key to obtain the private key, generate a random machine key (e.g., "temp machine key" of FIG. 10), encrypt the private key using the random machine key to generate a second encrypted private key (e.g., "org1 private key" encrypted with "temp machine key" of FIG. 10), and display a visual code that includes a representation of the random machine key such that a second compute device (e.g., second user compute device 960 of FIG. 10) different than the first compute device receives a representation of the visual code; and receiving the second encrypted private key from the first compute device, the second compute device further configured to: extract the random machine key based on the representation of the visual code, request the second encrypted private key from a third compute device (e.g., cloud compute device 940 of FIG. 10), receive the second encrypted private key from the third compute device, decrypt the second encrypted private key using the random machine key to obtain the private key, generate a second machine key (e.g., "device2 machine key" of FIG. 10) associated with the second compute device, encrypt the private key using the second machine key to generate a third encrypted private key (e.g., "org1 private key" encrypted with "device2 machine key" of FIG. 10), hash the second machine key to generate a hashed second machine key, and send the third encrypted private key and the hashed second machine key to the third compute device.

In some implementations of method 1100, the compute device is further configured to (1) generate the public key and the private key and (2) encrypt the private key using the identifier key to generate the encrypted private key, and method 1100 further comprises: receiving, from the compute device, the public key and the encrypted private key.

Some implementations of method 1100 further comprise: receiving the encrypted sensor data from the sensor; and sending the encrypted sensor data to the compute device to cause the compute device to receive the encrypted sensor data.

Some implementations of method 1100 further comprise verifying that the user account is authorized to request the sensor data; and sending a representation of the request to the sensor in response to the verifying.

FIGS. 12A-12B show a flowchart of a method 1200 for sharing a link to access sensor data, according to an embodiment. In some implementations, method 1200 can be performed by a processor (e.g., processor 162 and/or a processor included in cloud compute device 240).

At 1201, a first request to share a link is received from a first compute device (e.g., user compute device 200 of FIG. 7) associated with a user account that is associated with an organization. At 1202, a second request to share the link is sent to a sensor (e.g., sensor 220 of FIG. 7) to cause an encrypted random string (e.g., "challenge string" encrypted with "org1 public key" of FIG. 7) to be received by the first compute device.

At 1203, an encrypted private key (e.g., "org1 private key" encrypted with "user1 password derived key" of FIG. 7) generated by encrypting a private key associated with the organization (e.g., "org1 private key" of FIG. 7) using an identifier key (e.g., "user1 password derived key" of FIG. 7) is sent to the first compute device to cause the first compute device to: decrypt the encrypted private key using the identifier key to obtain the private key, decrypt the encrypted random string using the private key to obtain a random string (e.g., "challenge string" of FIG. 7), encrypt a concatenation that includes representations of the random string and a random public key (e.g., "pubkey" of FIG. 7) using a public key associated with the sensor (e.g., "camera1 public key" signed with "org1 private key" of FIG. 7) to generate an encrypted concatenation (e.g., concatenation of "challenge string" and "pubkey" encrypted with "camera1 public key" of FIG. 7), and send the encrypted concatenation to the sensor to cause the sensor to decrypt the encrypted concatenation using a private key associated with the sensor (e.g., "camera1 privkey" of FIG. 7) to obtain the random string and the random public key.

At 1204, an encrypted media key that was generated by encrypting a media key (e.g., "media key1" of FIG. 7) using the random public key after the random public key was received from the sensor is sent to a second compute device (e.g., second user compute device 260 of FIG. 7), to cause the second compute device to: receive from the first compute device the link generated by the first compute device and including a representation of a random private key (e.g., "privkey"), receive encrypted sensor data (e.g., "video_seg-ment1" encrypted with "media key1" of FIG. 7) generated by encrypting sensor data captured by the sensor using the media key, decrypt the encrypted media key using the random private key to obtain the media key, and decrypt the encrypted sensor data using the media key to obtain the sensor data.

Some implementations of method 1200 further include verifying, in response to receiving the first request, that the user account is authorized to share the link. The second request can be sent to the sensor in response to verifying that the user account is authorized to share the link.

In some implementations of method 1200, the identifier key is one of derived from a password associated with the user account or a machine key associated with the first compute device.

In some implementations of method 1200, causing the encrypted random string to be received by the first compute device includes: generating, via the sensor, the random string; encrypting, via the sensor, the random string using a public key (e.g., "org1 public key" of FIG. 7) that is associated with the organization to generate the encrypted random string; and sending, via the sensor, the encrypted random string to one of (1) the first compute device and not the apparatus or (2) the apparatus to cause the apparatus to send the encrypted random string to the first compute device.

In some implementations of method 1200, sending the encrypted private key to the first compute device further causes the first compute device to: generate the random public key and the random private key; receive from the apparatus a signed sensor public key (e.g., "camera public key" digitally signed with "org1 private key" of FIG. 7) generated by digitally signing the public key associated with the sensor (e.g., "camera1 public key" of FIG. 7) using the private key (e.g., "org 1 private key" of FIG. 7); and extract the public key associated with the sensor from the signed sensor public key in response to verifying that the public key associated with the sensor is signed using the private key.

FIG. 13 show a flowchart of a method 1300 for sharing a link to access sensor data, according to an embodiment. In some implementations, method 1300 can be performed by a processor (e.g., processor 162 and/or a processor included in cloud compute device 240).

At 1301, a first request to share a link is received from a first compute device (e.g., user compute device 200 of FIG. 8) associated with a user account that is associated with an organization. At 1302, a second request is sent to a sensor (e.g., camera 220 of FIG. 8) to share the link to cause an encrypted first key (e.g., "first key" encrypted with "org1 public key" of FIG. 8) to be received by the first compute device. At 1303, an encrypted private key (e.g., "org1 public key" encrypted with "user1 password derived key" of FIG. 8) generated by encrypting a private key (e.g., "org1 private key" of FIG. 8) associated with the organization using an identifier key (e.g., "user1 password derived key" of FIG. 8)

is sent to the first compute device, to cause the first compute device to send an encrypted random first key (e.g., "sharing pubkey" encrypted with "1$^{st}$ key" of FIG. 8) to the sensor. At 1304, a random first key (e.g., "sharing pubkey" of FIG. 8) is received from the sensor after the sensor has received the encrypted random first key from the first compute device and obtained the random first key from the encrypted random first key. At 1305, an encrypted media key (e.g., "media key 1" encrypted with "sharing pubkey" of FIG. 8) generated by encrypting a media key (e.g., "media key1" of FIG. 8) using the random first key is sent to a second compute device (e.g., second user compute device 260 of FIG. 8), to cause the second compute device to: receive from the first compute device the link generated by the first compute device and including a representation of a random second key (e.g., "privkey" of FIG. 8), receive, from the sensor, encrypted sensor data (e.g., "video_segment1" encrypted with "media key1" of FIG. 8) generated by encrypting sensor data captured by the sensor using the media key, decrypt the encrypted media key using the random second key to obtain the media key, and decrypt the encrypted sensor data using the media key to obtain the sensor data.

In some implementations of method 1300, the identifier key is one of derived from a password associated with the user account (e.g., "user1 password derived key" of FIG. 8) or a machine key associated with the first compute device (e.g., "device1 machine key" of FIG. 9).

In some implementations of method 1300, causing the encrypted first key to be received by the first compute device includes: generating, via the sensor, an encryption keypair including a first key (e.g., "first key" of FIG. 8) and a second key (e.g., "second key" of FIG. 8); encrypting, via the sensor, the first key using a public key (e.g., "org1 public key" of FIG. 8) that is associated with the organization to generate an encrypted first key; and sending, via the sensor, the encrypted first key to one of (1) the first compute device and not a second compute device that includes the one or more processor, or (2) the second compute device to cause the second compute device to send the encrypted random string to the first compute device. In some implementations, the public key is a first public key, the private key is a first private key, the first key is a second public key, and the second key is a second private key. In some implementations, the first key and the second key are symmetric keys.

In some implementations of method 1300, causing the first compute device to send the encrypted random first key to the sensor includes: decrypting, via the first compute device, the encrypted private key using the identifier key to obtain the private key; decrypting, via the first compute device, the encrypted private key using the private key to obtain a first key; generating, via the first compute device, the random first key and the random second key; encrypting, via the first compute device, the random first key using the first key to generate the encrypted random first key; and sending, via the first compute device, the encrypted random first key to the sensor.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:

receiving, via a processor of a first compute device and from a second compute device associated with (1) an organization and (2) a user account that is associated with the organization, a request for a predetermined amount of sensor data captured by a sensor, the predetermined amount predetermined based on a schedule, the sensor data captured by the sensor after the sensor generates a media key;

sending, via the processor and to the second compute device, an encrypted private key generated by encrypting a private key associated with the organization using an identifier key, to cause the second compute device to decrypt the encrypted private key using the identifier key to obtain the private key after receiving the encrypted private key;

sending, via the processor and to the second compute device, an encrypted media key generated by encrypting a media key using a public key associated with the organization, to cause the second compute device to decrypt the encrypted media key to obtain the media key after receiving the encrypted media key;

causing, via the processor, the second compute device to receive encrypted sensor data (1) generated by encrypting the sensor data using the media key and (2) without the first compute device storing the encrypted sensor data, to cause the second compute device to, in response to receiving the encrypted sensor data, (1) decrypt the encrypted sensor data using the media key to obtain the sensor data and (2) output a representation of the sensor data;

receiving, via the processor and from the sensor, a challenge string encrypted with the public key associated with the organization;

receiving, via the processor, a random public key from the sensor, the sensor storing a concatenation of the challenge string and the random public key;

authenticating, via the processor, a request to share a link from the second compute device to a third compute device; and sending, via the processor, the media key encrypted with the random public key to the third compute device.

2. The method of claim 1, wherein the identifier key is derived from a password associated with the user account.

3. The method of claim 1, further comprising:

sending, via the processor, the public key associated with the organization to the sensor, to cause the sensor to (1) generate the media key, (2) encrypt the media key using the public key to generate the encrypted media key, and (3) encrypt the sensor data using the media key to generate the encrypted sensor data; and receiving, via the processor and from the sensor, the encrypted media key.

4. The method of claim 1, wherein the identifier key is derived from a password associated with the user account, the request for the predetermined amount of sensor data is a first request, the password is a first password, the user account is a first user account, the encrypted private key is a first encrypted private key, and the method further comprises:

receiving, via the processor and from the second compute device, a second request associated with a second user account that is associated with the third compute device;

receiving, via the processor and from the second compute device, a second encrypted private key that was generated by the second compute device encrypting the private key using a second password;

sending, via the processor and to the third compute device, the second encrypted private key, to cause the third compute device to (1) decrypt the second encrypted private key using the second password to obtain the private key and (2) encrypt the private key using a second key derived from a password associated with the second user account to generate a third encrypted private key;

receiving, via the processor and from the third compute device, the third encrypted private key; and storing, via the processor and in response to receiving the third encrypted private key, the third encrypted private key.

5. The method of claim 1, wherein the identifier key is a first machine key associated with the second compute device, the encrypted private key is a first encrypted private key, and the method further comprises:

receiving, via the processor and from the second compute device, a request to authorize the third compute device;

identifying, via the processor and in response to the request, the first encrypted private key;

sending, via the processor and to the second compute device, the first encrypted private key to cause the second compute device to:

decrypt the first encrypted private key to obtain the private key, generate a random machine key, encrypt the private key using the random machine key to generate a second encrypted private key, and output a representation of the random machine key such that the third compute device receives the representation of the random machine key; and receiving, via the processor, the second encrypted private key from the second compute device, the third compute device further configured to:

extract the random machine key, request the second encrypted private key from the first compute device, receive the second encrypted private key from the first compute device, and decrypt the second encrypted private key using the random machine key to obtain the private key.

6. The method of claim 1, wherein the second compute device is further configured to (1) generate the public key and the private key and (2) encrypt the private key using the identifier key to generate the encrypted private key, and the method further comprises:

receiving, via the processor and from the second compute device, the public key and the encrypted private key.

7. The method of claim 1, further comprising:

verifying, via the processor and based on (1) a credential associated with the user account and (2) a list indicating permissions of a plurality of user accounts including the user account, that the user account is authorized to request the sensor data; and sending, via the processor, a representation of the request to the sensor in response to the verifying.

8. The method of claim 1, wherein the identifier key is derived from a machine key associated with the second compute device.

9. The method of claim 1, wherein the identifier key is a first machine key associated with the second compute device, the encrypted private key is a first encrypted private key, and the method further comprises:

receiving, via the processor and from the second compute device, a request to authorize the third compute device;

identifying, via the processor and in response to the request, the first encrypted private key; and receiving, via the processor, a second encrypted private key from the second compute device, the third compute device further configured to:

extract a random machine key, receive the second encrypted private key from a fourth compute device, decrypt the second encrypted private key using the random machine key to obtain the private key, generate a second machine key associated with the third compute device, encrypt the private key using the second machine key to generate a third encrypted private key, and send the third encrypted private key to the fourth compute device.

10. The method of claim 1, wherein the identifier key is a first machine key associated with the second compute device, the encrypted private key is a first encrypted private key, and the method further comprises:

identifying, via the processor, the first encrypted private key; and sending, via the processor and to the second compute device, the first encrypted private key to cause the second compute device to output a representation of a random machine key such that the third compute device different than the second compute device receives the representation of the random machine key.

11. The method of claim 10, wherein the identifying the first encrypted private key is based on an identifier.

12. The method of claim 1, wherein the sensor includes a camera.

13. The method of claim 1, wherein the identifier key is derived from a password associated with the user account, the request for the predetermined amount of sensor data is a first request, the password is a first password, the user account is a first user account, the encrypted private key is a first encrypted private key, and the method further comprises:

receiving, via the processor and from the second compute device, a second request associated with a second user account that is associated with the third compute device;

receiving, via the processor and from the second compute device, a second encrypted private key that was generated by the second compute device encrypting the private key using a second password; and sending, via the processor and to the third compute device, the second encrypted private key, to cause the third compute device to (1) decrypt the second encrypted private key using the second password to obtain the private key.

14. The method of claim 1, wherein the sensor data includes a livestream.

15. The method of claim 1, wherein the sensor data does not include a livestream.

16. The method of claim 1, wherein the identifier key is derived from a machine key associated with a browser of the second compute device.

17. The method of claim 1, wherein the private key is a symmetric key.

18. The method of claim 1, wherein the user account is associated with a user of the organization, and the identifier key is derived from a biometric of the user.

19. The method of claim 1, wherein the organization is a first organization, the sensor and the first compute device are owned by a second organization, and the second compute device is not owned by the second organization.

20. The method of claim 1, wherein the random public key has a predetermined expiration time.

\* \* \* \* \*